(12) United States Patent
Lucas

(10) Patent No.: US 10,280,624 B2
(45) Date of Patent: May 7, 2019

(54) ROOF TILE SYSTEM

(71) Applicant: Sunscape Systems Ltd, Cardiff (GB)

(72) Inventor: Martyn Lucas, Vale of Glamorgan (GB)

(73) Assignee: SUNSCAPE SYSTEMS LTD, Cardiff, Wales ( * ) Notice: Subject to any disclaimer, the term of this patent is extended or adjusted under 35 U.S.C. 154(b) by 0 days.

(21) Appl. No.: 14/829,528

(22) Filed: Aug. 18, 2015

(65) Prior Publication Data
US 2015/0354217 A1 Dec. 10, 2015

Related U.S. Application Data

(63) Continuation of application No. PCT/EP2014/053266, filed on Feb. 19, 2014.

(30) Foreign Application Priority Data

Feb. 21, 2013 (GB) .................................. 1303111.7

(51) Int. Cl.
*F24S 20/69* (2018.01)
*E04D 1/12* (2006.01)
(Continued)

(52) U.S. Cl.
CPC ................. *E04D 1/12* (2013.01); *E04D 1/30* (2013.01); *E04D 1/34* (2013.01); *E04D 12/004* (2013.01);
(Continued)

(58) Field of Classification Search
CPC .... E04D 1/12; E04D 1/34; E04D 1/00; E04D 1/30; E04D 2001/3408; E04D 2001/3414;
(Continued)

(56) References Cited

U.S. PATENT DOCUMENTS 4,210,122 A * 7/1980 Artweger ............... F24J 2/0455
126/622
5,164,020 A * 11/1992 Wagner .................. E04D 3/366
136/244
(Continued)

FOREIGN PATENT DOCUMENTS

AT 505553 A4 * 2/2009 ............. F24S 80/30
DE 1166993 B 4/1964
(Continued)

OTHER PUBLICATIONS

International Search Report dated Jun. 8, 2014 on related application PCT/EP2014/053266, filed Feb. 19, 2014 and published as WO/2014/128183 on Aug. 28, 2014.
(Continued)

*Primary Examiner* — Adriana Figueroa
*Assistant Examiner* — Jessie T Fonseca
(74) *Attorney, Agent, or Firm* — EIP US LLP

(57) ABSTRACT

A roof tile system and a method for installing the roof tile system is disclosed. The roof tile system comprises a first roof tile and a tile-holding device. The first roof tile comprises a first attaching means, the first attaching means for attaching the first roof tile to a second roof tile when the first roof tile and the second roof tile are arranged together on a roof. The first roof tile further comprises a flange extending from a first end portion. The tile holding device for fixing tiles to the roof comprises a channel for receiving the flange so as to inhibit lifting of the first end portion away from the roof.

16 Claims, 20 Drawing Sheets

(51) Int. Cl.
*E04D 1/30* (2006.01)
*E04D 1/34* (2006.01)
*E04D 12/00* (2006.01)

(52) U.S. Cl.
CPC ...... *F24S 20/69* (2018.05); *E04D 2001/3447* (2013.01); *E04D 2001/3455* (2013.01); *E04D 2001/3461* (2013.01); *E04D 2001/3467* (2013.01); *E04D 2001/3485* (2013.01); *E04D 2001/3494* (2013.01); *Y02B 10/20* (2013.01); *Y02E 10/44* (2013.01)

(58) Field of Classification Search
CPC .... E04D 2001/3423; E04D 2001/3429; E04D 2001/3447; E04D 2001/3452; E04D 2001/3458; E04D 2001/3461; E04D 2001/3467; E04D 2001/3479; E04D 2001/3485; E04D 1/28; E04D 2001/3455; F24J 2/0455; F24J 2/52; H02S 20/25; Y02B 10/20; Y02E 10/44; F24S 20/69; F24S 25/40
See application file for complete search history.

(56) References Cited

U.S. PATENT DOCUMENTS

| | | | |
|---|---|---|---|
| 6,052,961 A | 4/2000 | Gibbs | |
| 2002/0152697 A1* | 10/2002 | Hokkirigawa | C04B 18/101 52/173.1 |
| 2004/0098932 A1* | 5/2004 | Broatch | F24J 2/0455 52/173.1 |
| 2004/0134483 A1* | 7/2004 | Pajk | F24J 2/0455 126/622 |
| 2004/0187434 A1 | 9/2004 | Podirsky | |
| 2010/0024803 A1* | 2/2010 | Volcan | F24J 2/0455 126/634 |
| 2014/0069036 A1* | 3/2014 | Noton | E04D 1/04 52/173.3 |
| 2014/0305050 A1* | 10/2014 | Schulze | F24J 2/52 52/173.3 |

FOREIGN PATENT DOCUMENTS

| | | | | |
|---|---|---|---|---|
| EP | 2149647 A2 * | 2/2010 | | F24J 2/0455 |
| EP | 2304122 A1 | 1/2012 | | |
| GB | 2202245 A | 9/1988 | | |
| GB | 2473447 A | 3/2011 | | |
| GB | 24737447 A | 3/2011 | | |
| WO | WO-8400187 A1 * | 1/1984 | | E04D 1/30 |
| WO | 1992016972 A1 | 10/1992 | | |

OTHER PUBLICATIONS

EP Examination Report dated Dec. 21, 2016 for EP Application No. 14709570.7.

European Examination Report dated Nov. 10, 2017 issued on related application No. EP 14709570.7, filed Sep. 21, 2015.

\* cited by examiner

ROOF TILE SYSTEM

CROSS-REFERENCE TO RELATED APPLICATIONS

This application is a continuation under 35 U.S.C. § 120 of International Application No. PCT/EP2014/053266, filed Feb. 19, 2014 (published by the International Bureau as International Publication No. WO/2014/128183 on Aug. 28, 2014), which claims priority to GB Application No. 1303111.7, filed Feb. 21, 2013. The entire contents of the above-referenced patent applications are hereby incorporated by reference.

BACKGROUND OF THE INVENTION

Field of the Invention

The present invention relates to a roof tile system, and a method of installing a roof tile system.

Description of the Related Technology

Tiles are commonly used as a covering for pitched roofs, such as the roofs of houses. Tiles made from clay, concrete or slate are particularly common due to their durability, fire resistance, and their ability to shed water and resist the elements (wind). Many tile materials can be manufactured in a range of shapes to provide different appearances. For example, clay tiles are manufactured by baking plates of molded clay into a relatively lightweight tile and similarly, concrete tiles, which are heavier and more durable, can be poured into molds. Other materials, such as slate, may also be chosen for their natural appearance.

Conventionally, roof tiles are fixed to a roof by first installing an underlying waterproof membrane, installing metal flashing (where needed), and then fixing to battens. The battens are arranged horizontally and substantially parallel to each other and are typically fixed to the roof with nails. The battens provide a support structure onto which the tiles are supported and fixed.

Typically, during installation of a tiled roof, the tiles are laid onto the battens at the bottom edge of the roof and nailed to the battens via holes formed in the tiles during manufacture. Rows of tiles are then fixed to successive horizontal battens starting from the lower edge of the roof and working up such that the lower edge of one row of tiles overlaps the tiles of the row immediately below. Typically, the tiles of a given row will cover the nails holding the tiles of the row immediately below to the batten. Finally, when all the rows are fixed to the battens a ridge tile is fitted to the apex of the roof.

In some cases, depending on the pitch of the roof, the weight of the tiles, local building regulations, and anticipated local winds not every row of tiles is supported by or fixed to a batten.

For lighter slate or composite tiles, the lower end of the tile may be fixed to the tile below with a nail or a mechanical clip. For heavier tiles, the lower end may not be fixed at all and the weight of the tile or, where each tile interlocks with adjacent tiles, the combined weight of a row of tiles, is used to resist wind-lift (that is, lifting of the tiles by the wind).

Methods for fixing composite tiles without nails are also known. However, many of the methods of fixing composite tiles require additional fixtures to hold each tile in place and, in particular, require an additional fixture to hold down the lower end of each tile. This can be very time consuming and therefore costly to install.

GB2473447 describes a tile holding system in which conventional battens are replaced with a tile holding device that acts to hold the upper end of one row of tiles, and the lower end of an adjacent row of tiles, to the roof.

It is desirable to provide roof tiles that are easier to install, and easier to remove without causing damage to the tiles.

SUMMARY

In accordance with the present invention, there is provided a roof tile system, comprising: a first roof tile comprising a first attaching means, the first attaching means for attaching the first roof tile to a second roof tile when the first roof tile and the second roof tile are arranged together on a roof; the first roof tile further comprising a flange extending from a first end portion; and a tile holding device for fixing to the roof, the tile holding device comprising a channel for receiving the flange so as to inhibit lifting of the first end portion away from the roof.

Features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Roof Tile System

Described herein is a roof tile system and a method for installing the roof tile system. The roof tile system comprises a first roof tile and a tile-holding device.

The roof tile comprises, at a first end portion, a first attaching means for attaching the first roof tile to a second roof tile when the first roof tile and the second roof tile are arranged together on a roof. The first roof tile further comprises a flange extending from a first end portion.

The tile-holding device comprises a channel for receiving the flange so as to inhibit lifting of the first end portion away from the roof.

The inventor of the present invention has appreciated that in certain prior art roof tile systems, such as the system described in GB2473447, the rigidity of the tile can make installation of the tile difficult and therefore more time consuming and costly. In particular, the inventor has appreciated that once one end of a tile such as that disclosed in GB2473447, is inserted into a tile-holding device, the rigidity of the tile makes it difficult to insert the opposite end of the tile into another tile holding device. Furthermore, since both ends of the tile must be held by a tile-holding device, accurate placement of the tile-holding devices is critical for the roof tile system to be installed properly. In the roof tile system described herein, each roof tile is fixed to the roof via only one tile holding device, thereby avoiding certain problems in the prior art without the need to fix the roof tiles to a batten with nails or screws.

The Roof Tile

Figure 1A:
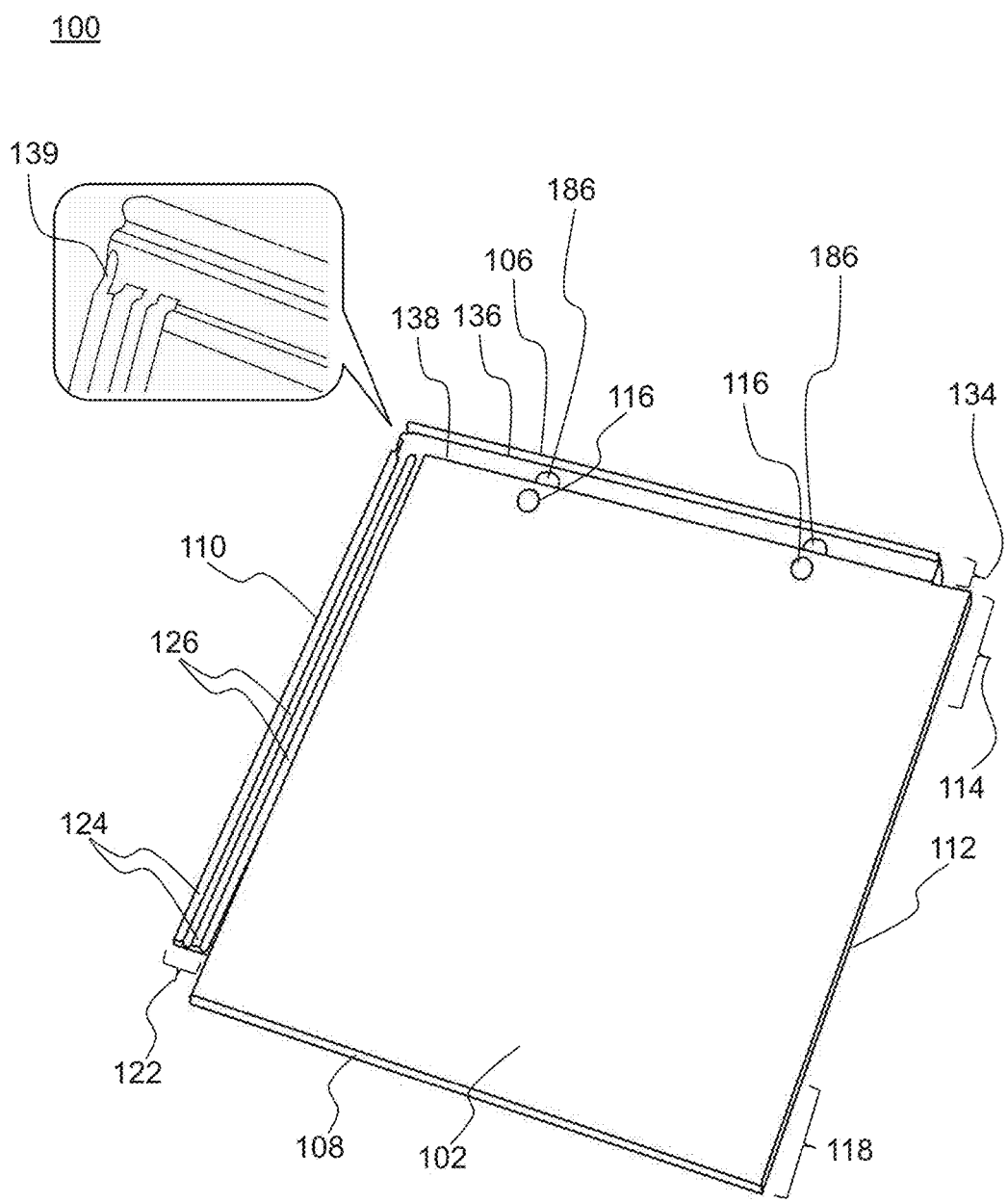
FIG. 1a is a perspective diagram illustrating a front side of a roof tile in accordance with an embodiment.
Figure 1B:
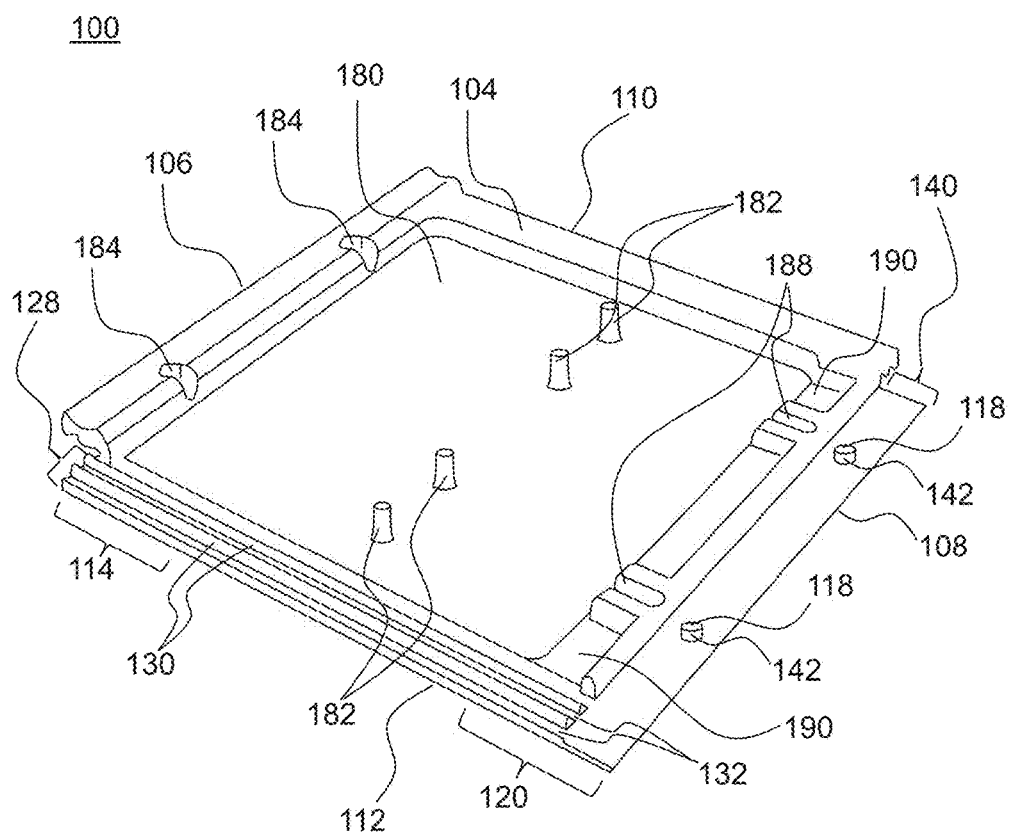
FIG. 1b is a perspective diagram illustrating a back side of a roof tile in accordance with an embodiment.

FIGS. 1a and 1b show an exemplary roof tile 100. The tile 100 has a planar front surface 102 that, in use, forms part of a tiled roof surface, and a back surface 104, that, in use is not visible.

The tile 100 has an upper end 106 and a lower end 108, upper and lower ends referring to the relative heights of the ends of the tile, when the tile is installed. The tile also has a first, left, edge 110 and a second, right, edge 112 (as viewed looking in the plane of the page).

In use, the tile 100 is held in place on a roof by a tile-holding device, described in detail below, that is located at the upper end 106 of the tile. The lower end 108 of the tile sits on one or more tiles in a lower row, and mechanically couples to the tiles in the lower row, by tile interconnects that are also described in detail below.

In an upper portion 114 of the front surface 102 of the tile are two recesses 116. The recesses 116 are arranged to receive corresponding protrusions 118 located in a lower portion 120 of an adjacent tile. The protrusions 118 are described in detail below.

In some embodiments, the two recesses 116 of a tile 100 of, for example, a lower row of tiles may receive the two corresponding protrusions 118 of a tile of, for example, an upper row of tiles.

In some embodiments, the tiles of, for example, an upper row of tiles may be staggered by, for example, half a tile width with respect to, for example, a lower row of tiles. In this case, one of the two recesses 116 of a tile of the lower row of tiles may receive one of the two protrusions 118 of a first adjacent tile of the upper row of tiles, and the other one of the two recesses 116 of the tile of the lower row of tiles may receive one of the two protrusions 118 of a second adjacent tile of the upper row of tiles.

Typically, the tile 100 is composed of a resin that binds together reconstituted slate-granules in a matrix. The granules and resin are mixed together with the resin in liquid form, and injected into a mold that acts as a cast for the roof tile. The resin may then be cured by the application of one or more of heat, pressure, and vibration. In some embodiments, a hardener may added to aid solidification of the resin and hold the slate granules in a matrix. The mold is then opened and the rigid solidified tile is removed. Typically, the slate material comprises 80% of the mixture by weight. The slate granules may be formed from recycled slate such as damaged slate tiles and off cuts, or from waste quarried slate, thereby reducing the cost of the slate material and therefore the composite tile. The slate granules may be formed by grinding larger slate pieces to a power with granules in the diameter range 1 mm to 3 mm.

By molding the matrix tiles 100 can be cast or molded into a variety of shapes and enables different profiles and textures to be formed on the planar surface of the tile, to provide different aesthetic appearances. Although embodiments described herein are described as planar tiles, it will be understood that embodiments of the invention may also comprise non-planar surfaces.

On the left edge 110 of the tile 100 there is a left interlock recess 122 in the front surface 102 running along the length of the left edge 110. In the left interlock recess 122, are a series of ridges 124 and valleys 126. On the right edge 112 of the tile 100 there is a right interlock recess 128 in the bottom surface 104 running along the length of the right edge 112. In the right interlock recess 128 are a series of ridges 130 and valleys 132.

The ridges 130 of the right interlock recess 128 are arranged to fit in the valleys 126 of the left interlock recess 122, and the ridges 124 of the left interlock recess 122 are arranged to fit in the valleys 132 of the right interlock recess 128. Therefore, when two tiles are aligned next to each other (that is, in a row), the ridges 124, 130 interlock to prevent lateral movement of a given tile with respect to an adjacent tile (in that row).

In some embodiments, the left interlock recess 122 has deeper valleys 126 than the corresponding valleys 132 in the right interlock recess 128. In other words, there is always a gap between the ridges 130 of the right interlock recess 128 and the valleys 126 of the left interlock recess 122 even where there is otherwise a tight seal between adjacent tiles 100. In use, this results in the formation of channels running along the left interlock recess 122 of each tile that act to guide and drain water that collects between the tiles.

The ridges 124, 130 and valleys 126, 132 may have any suitable cross-sectional profile. In some embodiments, the ridges 124, 130 and valleys 126, 132 have a square cross-sectional profile. In some embodiments, the ridges 124, 130 and valleys 126, 132 may be beveled or chamfered for ease of molding.

The upper end 106 of the tile 100 has an upper recess 134 in the front surface 102 of the tile 100 running along the length of the upper end 106. As shown in FIG. 1b, in some embodiments, the upper recess 134 also protrudes beyond the plane of the bottom surface 104. In the upper recess 134, there are profile features 136 also running along the length of the tile. The profile features 136 of the upper recess form an engaging flange that is arranged to engage with a tile-holding device as described in detail below.

In some embodiments, the upper recess 134 includes a channel 138 that is arranged to provide a fluidic connection with the valleys 126 in the left interlock recess 122. In use, the channel 138 carries water that would otherwise collect in the upper recess 134 toward the left edge 110 of the tile. This water is then drained by the valleys 126 formed in the left interlock recess 122 towards a tile 100 in the row below, and so on, until the water reaches the edge of the roof and can be drained by a conventional guttering system. In some embodiments, the channel 138 is arranged to be closer to the upper end 106 of the tile 100 at the right edge 112 of the tile than at the left edge 110 of the tile 100.

In some embodiments, the channel 138 includes a ridge 139, as shown in the inset to FIG. 1a, which guides the water flowing along the channel 138 into valleys 126 formed in the left interlock recess 122.

In some embodiments, the valleys 126 in the left interlock recess 122 are deeper, with respect to the front surface 102, at the upper end 106 of the tile 100 than at the lower end 108 of the tile 100. In one example, the depth of the valleys 126 vary from ~5 mm at the upper end 106 to <3 mm at the lower end 108. Varying the depth of the valleys 126 in this way ensures that there is sufficient depth in the valleys 126 at the upper end 106 of the tile 100 to allow any water caught in channel 138 in the upper recess 134 to be drained.

The lower end 108 of the tile 100 has a lower recess 140 in the back surface 104 of the tile running along the length of the lower end 108. The depth of the lower recess 140 is arranged such that, in use, the lower recess 140 corresponds in depth with the upper recess 134 of a tile 100 in the row below. In use, the lower recess 140 forms an overlaying portion of the tile 100 which overlays at least part of the front surface 102 of at least one of the tiles in the row below, such that the lower recess 140 acts to direct rain water that is driven under the tile 100 into the channel 138 of a tile 100 in the row below. The overlaying portion of the tile 100 therefore retains a thin slate-like profile on the roof when installed, reducing the thickness of the lower end 108 so as to minimize wind lift, while providing enough depth to the tile 100 to accommodate fluid cassettes as described below with reference to FIG. 5.

In the lower recess 140, are a series of protrusions 118 extending from the surface of the lower recess 140 toward the plane of the back surface 104 of the tile 100. The protrusions 118 may be, for example, studs, which correspond in size and shape with the holes 116 in the upper portion 114 of the front surface 102 of the tile 100. In use, the protrusions 118 of one tile 100 can be inserted into the holes 116 of another tile 100 to form an interference fit (i.e. fastening is achieved at least partly by friction after the parts are pushed together, alternatively referred to in the below as a compression fit) or a snap fit. In this way the lower end 108 of one tile 100 is rigidly, but removably, held by the mating protrusions 118 and holes 116 to the upper end 106 of an adjacent tile 100.

In some embodiments, the protrusions 118 include an expansion mechanism 142 that is compressed during fitting of the tile, and expands to provide a compression fitting, thus preventing lifting of the lower end 108 of the tile 100 after fitting.

Figure 1C:
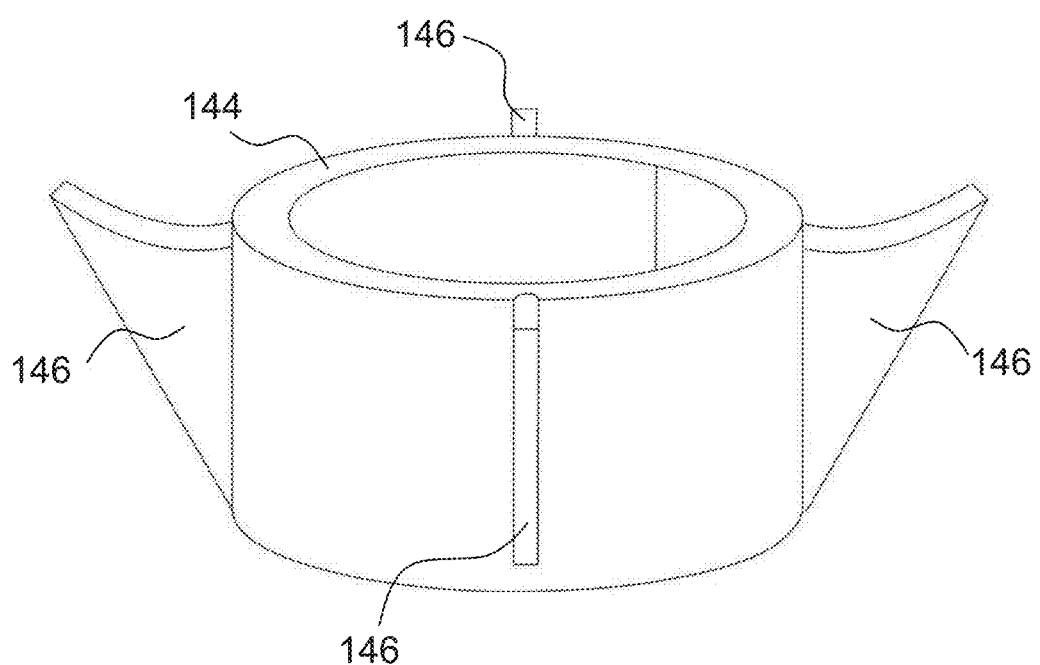
FIG. 1c is a perspective diagram illustrating an exemplary expansion mechanism.

FIG. 1c shows an exemplary expansion mechanism 142. The expansion mechanism 142 shown is a collar 144 that, in use, is attached to each of the protrusions 118 on the lower surface of the tile 100. The collar 144 comprises flexible hooks 146 that enable the collar to be inserted into and through the holes 116 in the upper portion 114 of the front surface 102 of an adjacent tile 100. The hooks 146 enable the expansion mechanism 142 to be inserted in to the holes 116 relatively easily, but make removal of the expansion mechanism difficult, thereby, in use, holding the lower end 108 of one tile 100 in contact with the upper end 106 of a tile 100 in a row below.

In some embodiments, the expansion mechanism 142 may be formed with the protrusions 118 during manufacture. In some embodiments, the expansion mechanism 142 may be formed separately and attached to the protrusions 118 using an adhesive, or any other suitable fixing method, either during manufacture or during installation of the tiles 100.

Figure 1D:
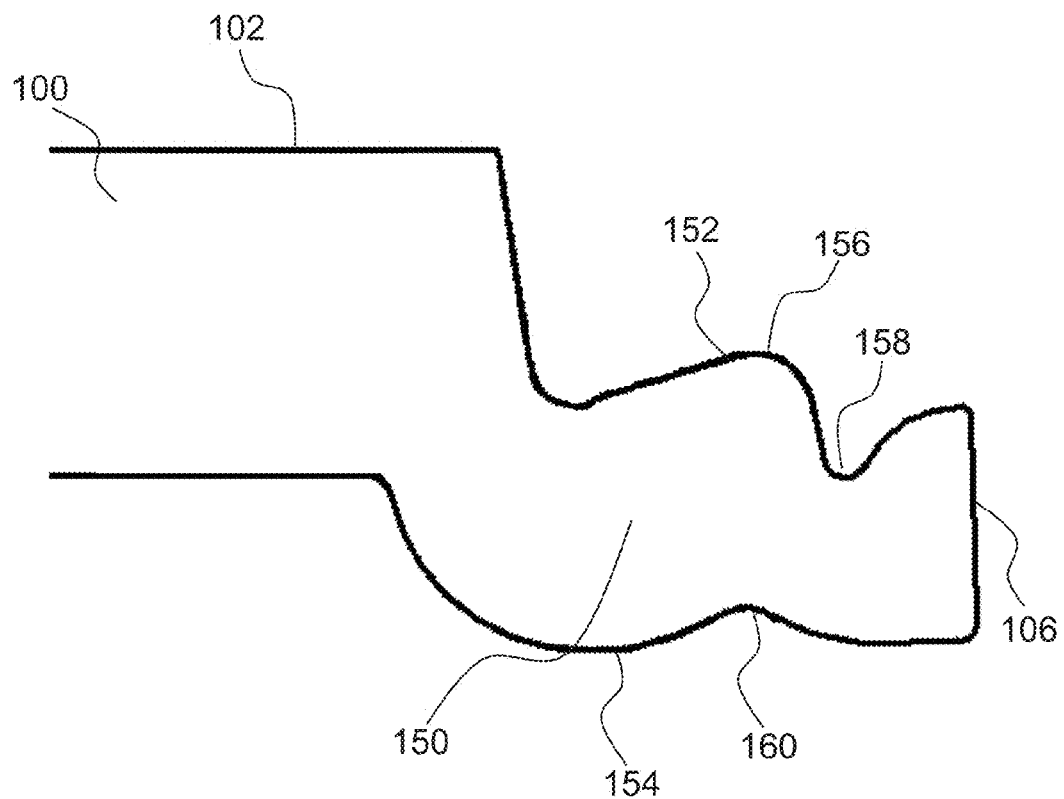
FIG. 1d is a cross-section of a flange forming part of a roof tile in accordance with an embodiment.

FIG. 1d shows a cross-sectional view of an exemplary engaging flange 150 formed towards the upper end 106 of the tile 100. The flange 150 extends in a direction away from the upper end of the front surface 102 of the tile 100. The flange 150 comprises an upper surface 152, and a lower surface 154.

As the flange 150 extends the profile of the upper surface 152 increases at a shallow angle to a peak 156 and then drops sharply to form a deep recess 158 and then rises again to the upper end 106 of the tile 100. The deep recess 158 can be engaged with a tile-holding device as described below.

As the flange 150 extends the profile of the lower surface 154 curves to a shallow recess 160 and then curves and rises to the upper end 106 of the tile 100. The profile of the lower surface 154 is arranged to correspond to the profile of a tile-holding device as described below and act as a surface on which the tile can be pivoted.

As shown in FIG. 1b, in some embodiments, the back surface 104 of the tile 100 comprises a cassette recess 180 arranged to accommodate a fluid cassette that may form part of a solar energy capture system. Located in the cassette recess 180 are cassette mounts 182. In this example, the cassette mounts 182 are cylindrical protrusions extending from the surface of the cassette recess 180 and have a diameter arranged to engage a fluid cassette as described below. Although 4 cassette mounts 182 are shown in FIG. 1b, it will be understood that other numbers of cassette mounts 182 may be used depending on the configuration of cassette that is to be received in the cassette recess 180.

In the embodiment shown in FIG. 1b, there is also provided a pair of inlet channels 184 extending from the upper end of the cassette recess 180 in the back surface 104 through the flange 150 and toward the upper end 106 of the tile 100. Each inlet channel terminates with an inlet hole 186 passing through to the upper surface 152 of the flange 150. There is also provided a pair of outlet channels 188 extending from the lower end of the cassette recess 180 in the back surface 104.

In some embodiments, the back surface 104 of the tile 100 comprises other recesses that are not arranged to receive any part such as the recesses 190 formed in the back surface 104 of the tile 100 shown in FIG. 1b. These other recesses reduce the weight of the tile, making installation easier and therefore quicker, and also reduce the amount of material needed to form the tile 100.

Tile-Holding Device

Figure 2:
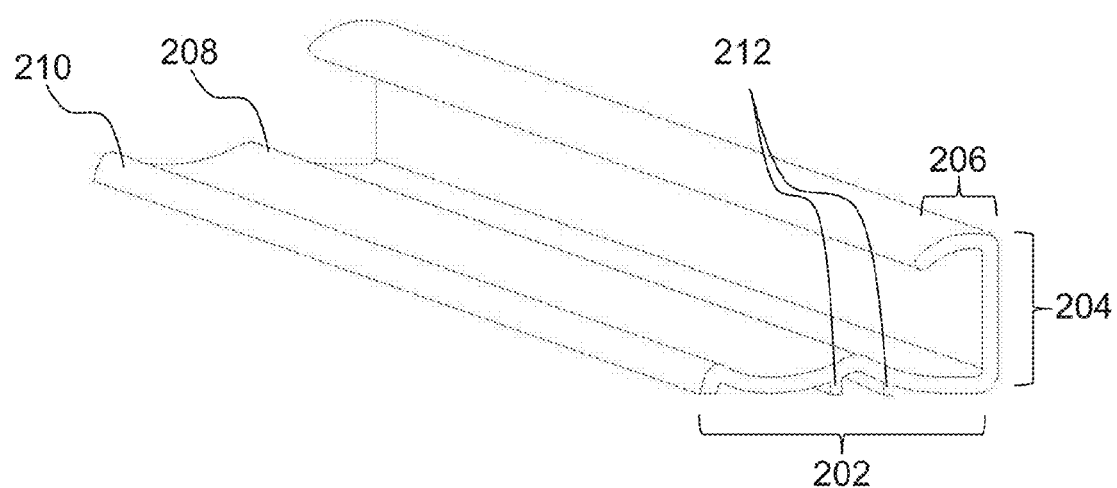
FIG. 2 is a perspective diagram illustrating a tile-holding device in accordance with an embodiment.

FIG. 2 shows a tile-holding device 200 arranged to hold tiles 100 to a roof. The tile-holding device 200 comprises a base portion 202, a back portion 204 and an engagement portion 206. In use, the base portion 202 is fixed to the joists of a roof with, for example, nails or screws.

In the embodiment shown in FIG. 2, the base portion 202 comprises a raised central spine 208 and a raised lower spine 210. The central spine 208 is supported by two stiffening ribs 212 that extend from the bottom surface of the tile-holding device 200. The stiffening ribs 212 increase the rigidity of the tile-holding device 200 and support the central spine 208 when in use. The central spine 208 is arranged to interface with the shallow recess 160 in the lower surface 154 of the flange 150. The base portion 202 curves from the central spine 208 to the lower spine 210 with a curvature corresponding to the curvature of the lower surface 154 of the flange 150 such that the central and lower spines 208, 210 act to seat the flange 150 in the correct position, when the flange 150 is engaged with the tile-holding device 200.

Between the central and lower spines 208, 210 is a shallow channel that may have a planar bottom that acts as a visual guide to position nails, screws or other fixing means used to fix the tile-holding device 200 to the roof as described in detail below.

Although the base portion 202 is described with a particular profile it will be understood that other profiles may be used to achieve the same function. Indeed, in certain examples, the base portion 202 may be substantially planar.

The back portion 204 extends at a substantially perpendicular angle from the base portion 202 and is arranged to support the engagement portion 206. It will be understood that the back portion 204 may extend from any suitable point on the base portion 202.

The engagement portion 206 extends from the end of the back portion 204 at a substantially perpendicular angle. As the engagement portion 206 extends, it curves toward the base portion 202; the curve forms an upper arc and defines a channel between the engagement portion 206 and the base portion 202. The degree of curvature of the upper arc of the engagement portion 206, and the extent to which the engagement portion 206 extends from the back portion 204 are chosen such that the engaging flange 150 at the upper edge 106 of the tile 100 can be inserted between the engagement portion 206 and the base portion 202 when the plane of the tile 100 is oriented at an angle with respect to the plane of the base portion 202. In one example, the dimensions of the flange 150 and the engagement portion 206 are such that when the angle between the plane of the tile 100 and the plane of the base portion 202 is about 45 degrees, the flange 150 can fit between the engagement portion 206 and the base portion 202. At this angle, the flange 150 can be inserted into, and removed from, the channel between the engagement portion 206 and the base portion 202, and thereby the tile 100 can be engaged or disengaged with the tile-holding device 200.

When the flange 150 is inserted in the channel between the engagement portion 206 and the base portion 202, if the tile 100 is oriented such that the plane of the tile 100 aligns substantially with the plane of the base portion 202 (that is, the plane of the front surface of the tile 100 lies substantially in the plane of the surface of the roof), then the end of the engagement portion 206 hooks into the deep recess 158 of the flange 150 such that the upper end 106 of the tile 100 hooks under the upper arc of the engagement portion 206 of the tile-holding device 200. The flange 150 then becomes trapped. In this way, the tile-holding device 200 holds the tile 100 such that the tile 100 cannot move with respect to the tile-holding device 200. In use, the central and lower spines 208, 210 and the engagement portion 206 act to prevent the tile 100 from sliding down the roof and the engagement portion 206 further prevents the upper end 106 from being lifted away from the roof without the need for additional fixings such as nails or screws.

The tile-holding device 200 is typically made of a resilient material such that as the plane of the tile 100 is brought in line with the plane of the base portion 202, the flange 150 acts to force a separation between the base portion 202 and the engagement portion 206, and a reactive force is thereby applied to the flange 150 further holding the flange 150 in place. In addition to the hooking action of the upper arc, this acts to inhibit lateral movement of the tile with respect to an axis defined by the length of the tile-holding device 100 further. This ensures that the tile 100 cannot easily be removed without raising the lower end 108 of the tile 100 to about 45 degrees. However, if necessary, the tile 100 can be removed more easily than conventional tiles and without potentially damaging the tile 100.

The tile holding device 200 is typically made from an extruded medium-density or high-density plastics material. In some examples, the tile-holding device 200 may be made from one or more of polypropylene and HDPE. In other examples, the tile holding device 200 may be made from a metal material; the tile holding device 200 may be made from extruded aluminum.

Tiles Fitted Together

Figure 3A:
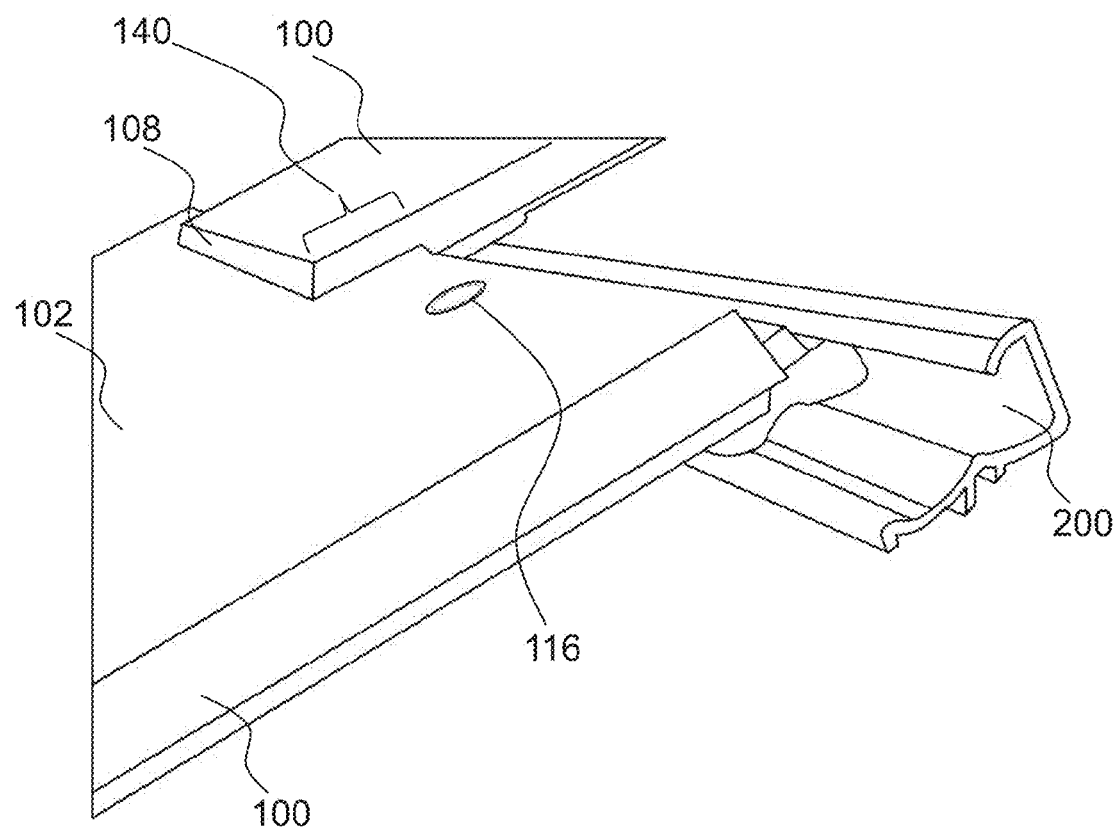
FIG. 3a is a perspective diagram illustrating an arrangement of tiles fitted to a roof in accordance with an embodiment.

FIG. 3a shows a cross-section of two connected tiles 100. As can be seen from FIG. 3a, the extent of the recess from the lower end 108 of the tile 100 is arranged such that, when two tiles 100 are connected by the mating protrusions 118 and holes 116, the lower recess 140 of the higher placed tile 100 overlies the upper portion 114 of the front surface 102 of the higher placed tile 100. In doing so, the holes 116 of the lower placed tile 100 are covered by the higher placed tile 100, such that the higher placed tile 100 prevents water from collecting in the holes 116 of the lower placed tile 100 and provides a roof surface with no apparent fixtures.

The corresponding upper and lower recesses 134, 140 enable a lowered upper end 106 of a lower placed tile 100 and an overlying and lowered lower end 108 of a higher placed tile 100 such that the step between the front surfaces of the two tiles is minimized, thus reducing the edge on which wind can catch the lower end 108 of a given tile. This in turn reduces the effect of wind-lift (that is, uplifting of a tile by the wind).

Figure 3B:
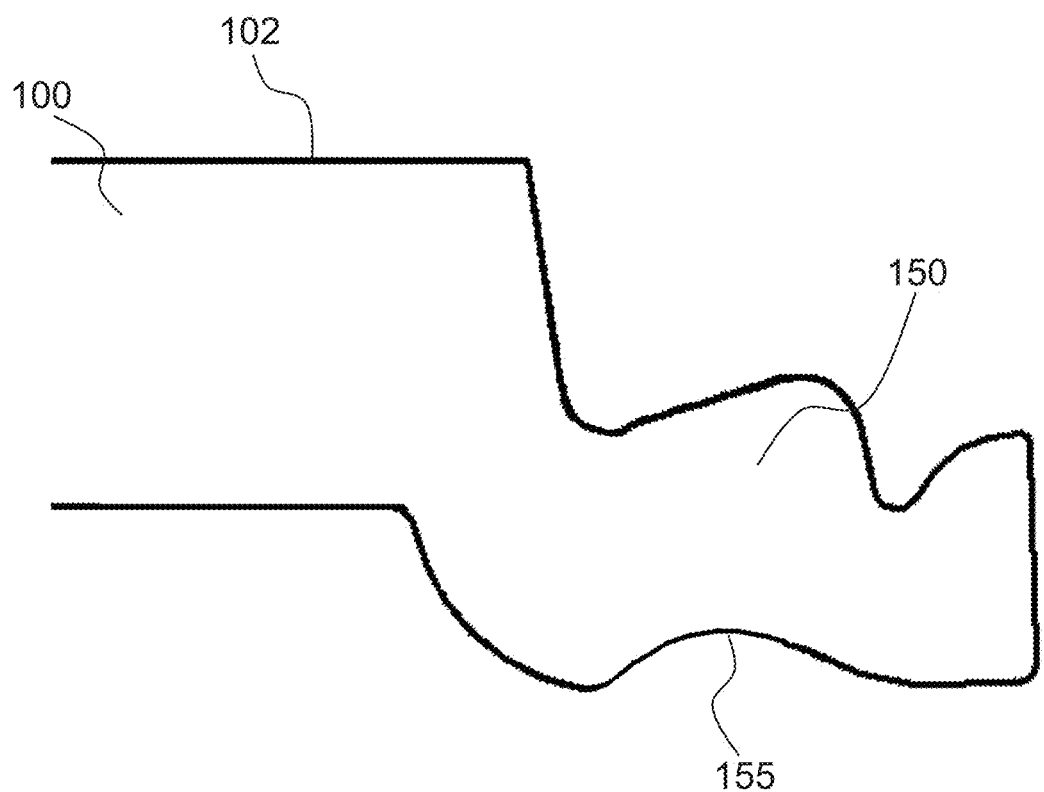
FIG. 3b is a cross-section of a flange forming part of a roof tile in accordance with an embodiment.

In some embodiments, the lower surface 154 of the flange 150 may be formed to accommodate the head of a screw or nail that is used to secure the tile-holding device 200 to the roof. For example, FIG. 3b shows an exemplary flange 150 in which the lower surface 154 of the flange 150 comprises a recess 155 large enough to accommodate a screw or nail head.

Although in the embodiment described with reference to FIGS. 1a to 3b the protrusions 118 and holes 116 used to fix the lower end 108 of one tile 100 to the upper end 106 of an adjacent tile 100, it will be understood that other configurations of protrusions 118 and holes 116 could be used. For example, the holes 116 could be replaced with slots, or even a groove extending across the width of the front face 102 of the tile 100, with one or more corresponding protruding features in the lower recess 140.

Method of Installation

Figure 4A:
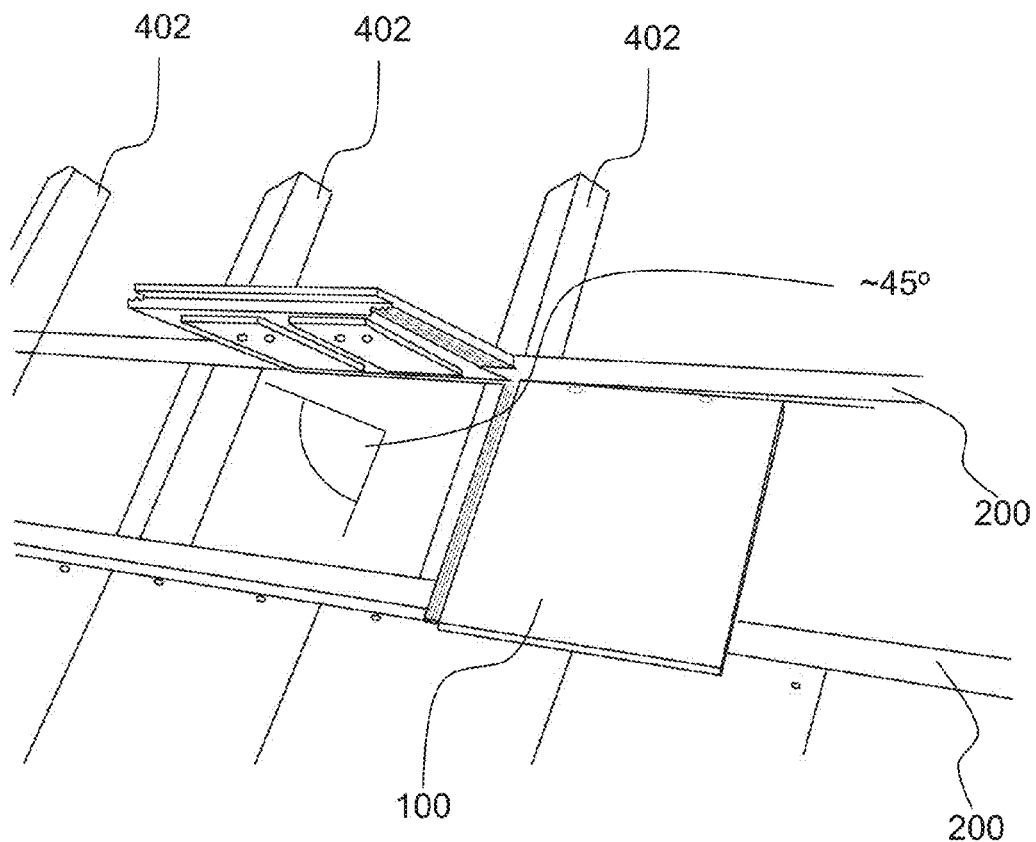
FIG. 4a is a perspective diagram illustrating a method of installing roof tiles in accordance with an embodiment.
Figure 4B:
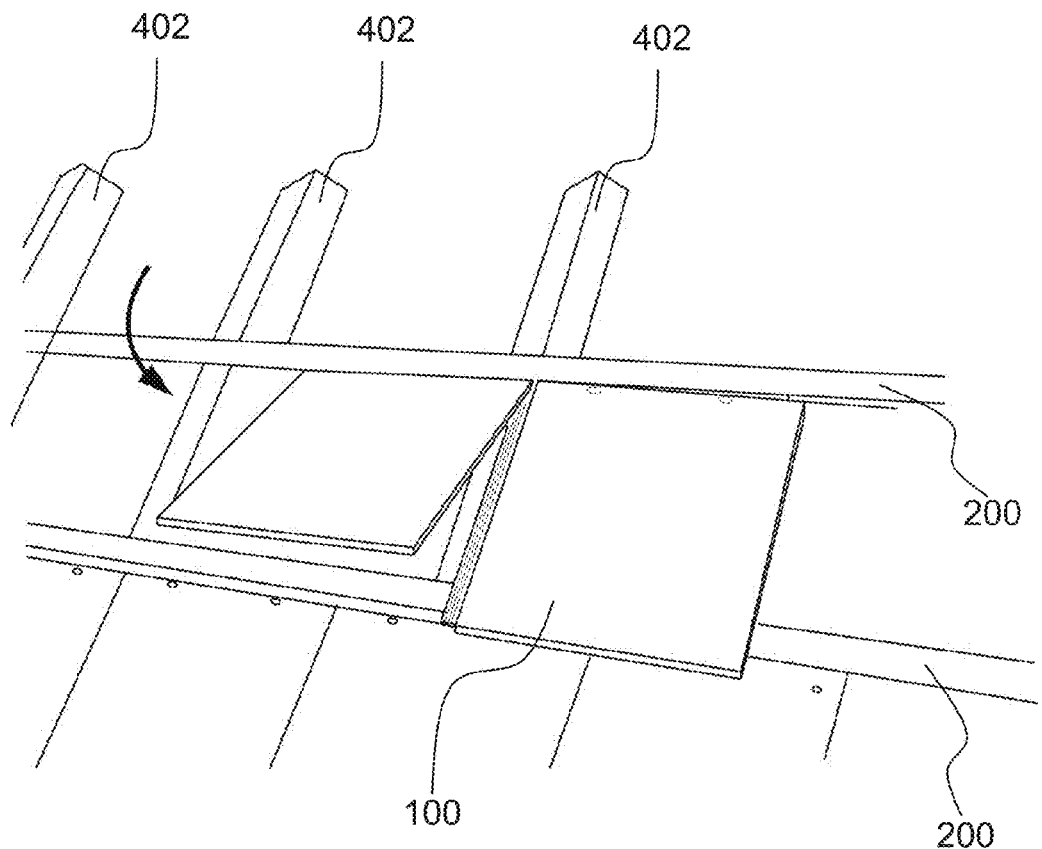
FIG. 4b is a perspective diagram illustrating a method of installing roof tiles in accordance with an embodiment.

As shown in FIGS. 4a and 4b, to fit the tiles 100 to a roof 400, the tile-holding devices 200 are arranged substantially horizontally on the roof 400, typically perpendicular to the joists 402 of the roof. The tile-holding device 200 may be fixed to the roof joists using one or more of nails, screws, and adhesive. Typically, the tile-holding device 200 is fixed to the roof joists at the shallow channel between the central and lower spines 208, 210. The tile-holding device 200 may be fixed to every joist 402 or, for example, every other joist 402, or at whatever interval is appropriate for the weight of the tiles 100 and the method of fixing the tile-holding device 200 to the joist 400.

The tile-holding devices 200 are spaced apart along the incline of the roof 400 by a predetermined distance that is dictated by the size of the roof tile 100.

To fit each tile 100, the flange 150 of the tile is inserted into the channel between the engagement portion 206 and the base portion 202 of a tile-holding device 200, in a first orientation, at approximately 45 degrees to the plane of the roof 400 (and the plane of the base portion 202 of the tile-holding device 200), as shown in FIG. 4a. The tile 100 is then moved (as shown in FIG. 4b) to a second orientation, such that the flange 150 engages with the tile-holding device 200 to form a locking fit.

Figure 4C:
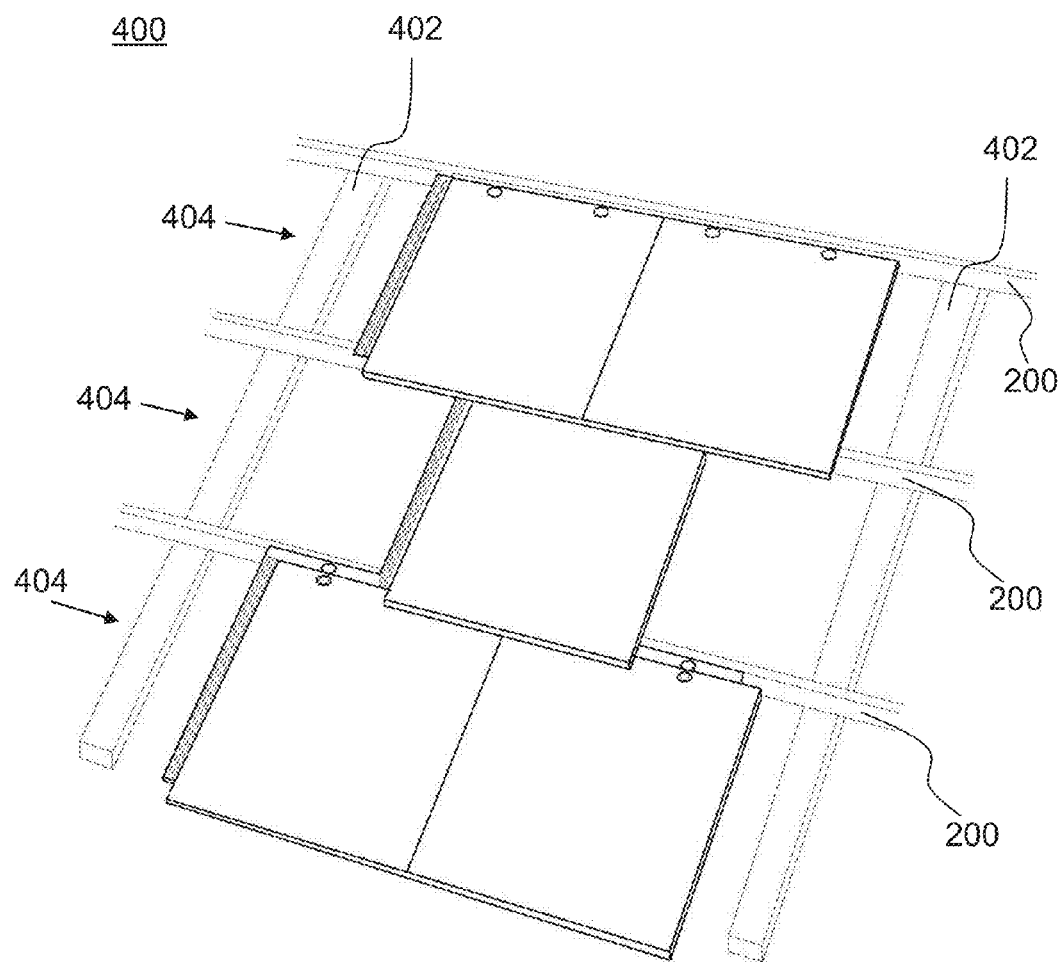
FIG. 4c is a perspective diagram illustrating a method of installing roof tiles in accordance with an embodiment.

As shown in FIG. 4c, the tiles 100 are inserted in rows 404, starting with the lowest row 404 (that is, the row at the lowest edge of the roof 400).

To install the first row 400, a first tile 100 is fitted to the tile-holding device 200 as described above with reference to FIGS. 4a and 4b. Typically, installation begins at the rightmost end of the roof 400 (from the perspective of the installer looking at the roof 400). Then a second tile 100 is fitted by aligning the right edge 112 of the second tile 100 with the left edge 110 of the first tile 100 such that the ridges 124, 130 and respective valleys 126, 132 in the respective interlocking recesses 122, 128 of the first and second tiles interlock appropriately. Subsequent tiles 100 are added in the same way until the first row 404 of tiles 100 is installed.

Once the first row 404 is installed, tiles 100 are inserted in the second row 404 as described above with reference to FIG. 4c. The tiles 100 in the second row 404 are aligned with the first row 404 such that the protrusions 118 of the second row tiles 100 align with the holes 116 in the front surface 102 of the first row tiles 100. As the tiles 100 are moved (as shown in FIG. 4b) to lock the tiles 100 into the tile-holding device 200 for the second row 404, the protrusions 118 near the lower edge 108 of the second row tiles 100 engage with the holes 116 in the upper portion 114 of the front surface 102 of the first row tiles 100, and lock (or at least hold) the lower end 108 of the second row tiles 100 to the upper end 106 of the first row tiles 100 (that is, friction prevents them from easily being lifted by wind).

Subsequent rows 404 are installed by repeating the sequence described for the second row 404 until the roof 400 is covered by the tiles 100.

Finally, a row of cap tiles (not shown), arranged to fit onto the apex of the roof 400, may be installed to provide a watertight roof 400.

In some examples, the tiles 100 may be arranged such that the left and right edges 110, 112 of tiles 100 in the first row 404 are in line with the left and right edges 110, 112 of tiles 100 installed in the second and subsequent rows 404.

For tiles 100 such as that described with reference to FIGS. 1a and 1b, in which the protrusions 118 and holes 116 are spaced equidistantly from the edges of the planar front surface 102, and symmetric about a center line of the tile 100 (running up the incline of the roof), the tiles 100 in the second row 404 may be staggered by half a tile width, as shown in FIG. 4c. Then, when a third row 404 is installed, it may be staggered by half a tile width with respect to the second row 404, such that the left and right edges 110, 112 of the tiles 100 in the third row 404 are aligned with the left and right edges 110, 112 of the tiles 100 in the first row 404. In a similar manner the left and right edges 110, 112 of tiles 100 in a fourth row 404 will be aligned with the left and right edges 110, 112 of tiles 100 in the second row 404, and so on. This provides a method in which, in the resulting roof tile arrangement, a given tile 100 in the main body of the roof is fixed to the tile-holding device 200 and to two adjacent tiles 100 in the row 404 immediately above at its upper end 106, and to two adjacent tiles 100 in the row 404 immediately below at its lower end 108. Therefore, each tile 100 in the main body of the roof surface is rigidly connected with four other tiles 100, which significantly increases the force required to remove any given tile 100, and thereby improves the resistance of the roof surface to, for example, wind-lift.

Removal of the tiles is essentially the reverse of the installation. Tiles 100 can be removed by applying a levering force to the lower end 108 of the tile 100 and disengaging the protrusions 118 of a higher placed tile 100 from the holes 116 in the upper end 106 of a lower placed tile 100. The lower end 108 can then be raised to disengage the flange 150 from the tile-holding device 200. Tiles 200 can thereby be removed without damaging the tile 100 and can be reused.

Solar Thermal System

Figure 5:
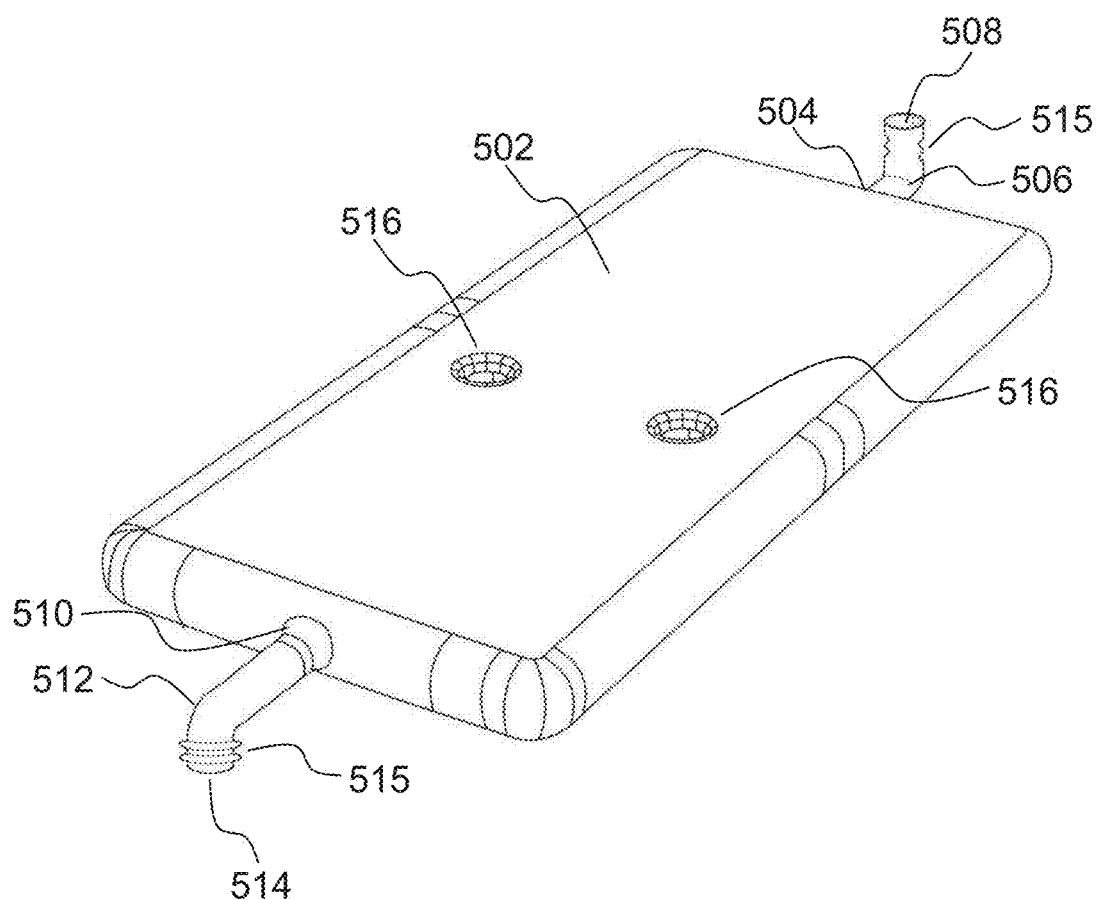
FIG. 5 is a perspective diagram illustrating an exemplary fluid cassette for use with a roof tile.

As described above, in some embodiments, the back surface 104 of the tile 100 comprises a recess 180 arranged to accommodate a fluid cassette that forms part of a solar energy capture system. An exemplary fluid cassette 500 is shown in FIG. 5. It will however be understood that other configurations of fluid cassette may be fitted to or included in the roof tile 100 of the present invention, which is not limited to the particular configuration of fluid cassette described.

The fluid cassette 500 has a main reservoir 502, which is a hollow body arranged to contain a volume of fluid. The reservoir 502 is substantially cuboid.

At one end of the reservoir 502 is a reservoir inlet port 504, extending from which, away from the reservoir 502, is an inlet pipe 506. The inlet pipe 506 extends away from the reservoir inlet port 504 for a distance and then turns via a bend through 90 degrees. The end of the inlet pipe 506 terminates with an inlet opening 508.

At an opposite end of the reservoir 502 is a reservoir outlet port 510, extending from which, away from the reservoir 502, is an outlet pipe 512. The outlet pipe 512 extends away from the reservoir outlet port 510 for a distance and then turns via a bend through 90 degrees, in an opposite direction to the inlet pipe 506. The end of the outlet pipe 512 terminates with an outlet opening 514.

An external diameter of the outlet opening 514 corresponds approximately with the internal diameter of the inlet opening 508, such that the outlet pipe 512 of one cassette 500 can be connected in series with the inlet pipe 506 of another cassette 500 to provide a push-fit. When multiple cassettes 500 are connected in series as described, the inlet pipes 506, outlet pipes 512 and reservoirs 502 of the respective cassettes 500 form a fluid path along which fluid can flow through each of the reservoirs 502 and on to the next cassette 500.

In some examples, as shown in FIG. 5, the outlet pipe 512 and/or the inlet pipe 506 may be provided with ribs 515 to increase the seal provided by the push-fit between the inlet and outlet pipes 506, 512.

The cassette 500 may be made from a plastics material and may be manufactured using, for example, a gas-assisted blow molding process. In some embodiments, the cassette 500 may be made from one or more of polypropylene, polyurethane, and HDPE, or from a similar plastics material.

In some embodiments, the cassette 500 may be made from a recycled plastics material. The thermal conductivity, coefficient of thermal expansion, resistance to temperature, and mechanical strength of the plastics material, are all considerations affecting the required thickness of the walls of the cassette 500. In one embodiment, the cassette 500 is made of 3 mm thick polyurethane.

Typically, in use, the cassettes 500 are filled with a glycol-based fluid, which can retain heat that is captured from the sun at the front surface 102 of the tile 100 and is transmitted to the back surface 104 of the tile 100 and subsequently to the cassette 500 by thermal conduction.

The cassette 500 comprises a series of mounting holes 516 passing through the main body of the cassette reservoir 502, that are located to correspond with cassette mounts 182 located in a cassette recess 180 in the back surface 104 of the tile 100. The diameter of the mounting holes 516 is arranged such that when engaged with the cassette mounts 182 of the tile 100, the cassette mounts 182 hold the cassette in place by, for example, an interference fit.

Figure 6:
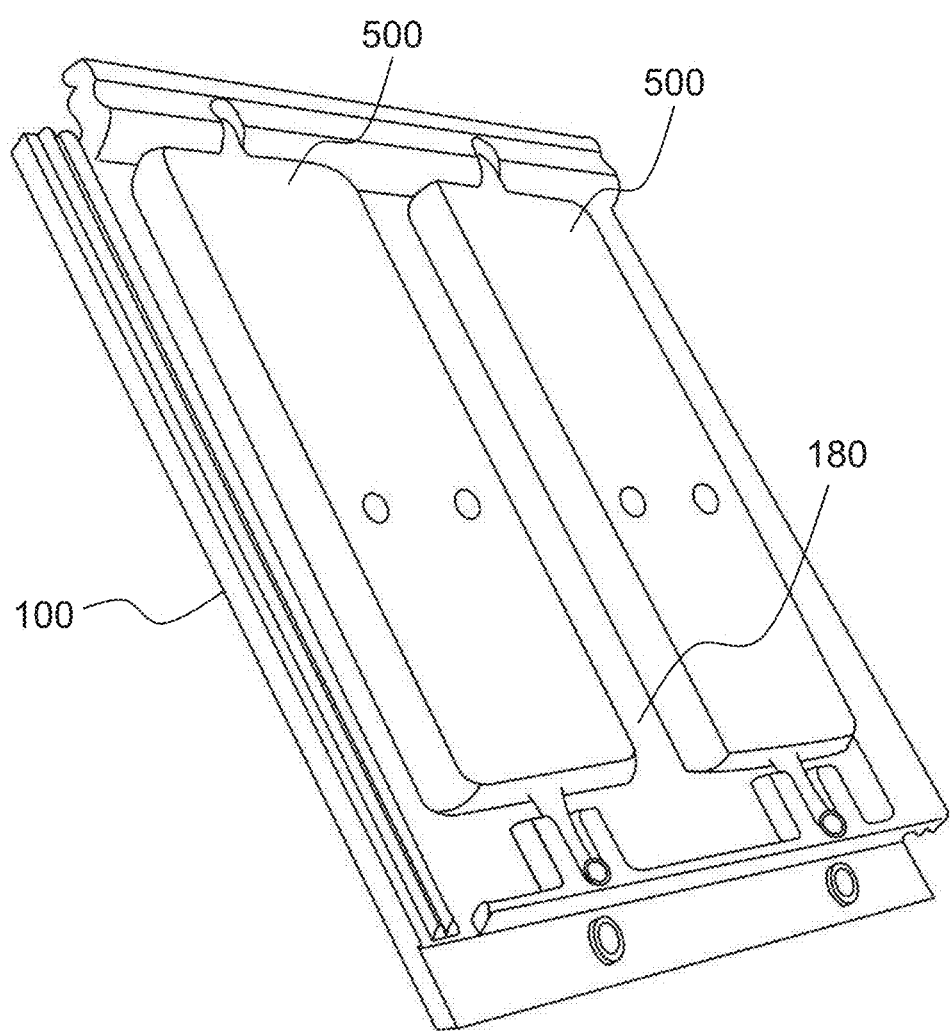
FIG. 6 is a perspective diagram illustrating an exemplary fluid cassette fitted to a roof tile.

FIG. 6 depicts a solar tile 600 comprising a tile 100 with a fluid cassette is mounted in the cassette recess 180. In the particular embodiment depicted in FIG. 6, the tile 100 is arranged to receive two fluid cassettes 500 arranged side-by-side. However, it will be understood that in other examples, only one cassette 500 may be received by the tile 100, or higher numbers of cassettes 500 may be received by the tile 100.

As described above with reference to FIG. 1b, the cassette recess 180 comprises cassette mounts 182. The cassette mounts 182 are arranged to engage with corresponding recesses in the cassette to hold the cassette in place in the recess. The dimensions of the cassette mounts 182 and the holes 516 may be such that the cassette 500 is held by an interference fit or a compression fit, or the cassette mounts 182 may form a snap fit. Alternatively, other mechanisms for fixing the cassette in place, such as for example, gluing, or screwing the cassette 500 in place may be employed.

The inlet pipe 506 of each received cassette 500 is located in the inlet channels 184 and inlet holes 186, and the outlet pipe 512 of each received cassette 500 is located in the outlet channels 188.

Although in the embodiments described above, the cassette mounts 182 and holes 516 are shown to be cylindrical in shape, it will be understood that any shape, size and extent of mutually corresponding inter-lockable cassette mounts 182 and holes 516 could be used to provide the means to hold the cassette 500 in the cassette recess 180.

The cassette recess 180, channels 184, 186 and holes 186 enable the tile to receive a cassette 500 capable of gathering solar thermal energy while maintaining the aesthetics of a conventional roof.

Figure 7:
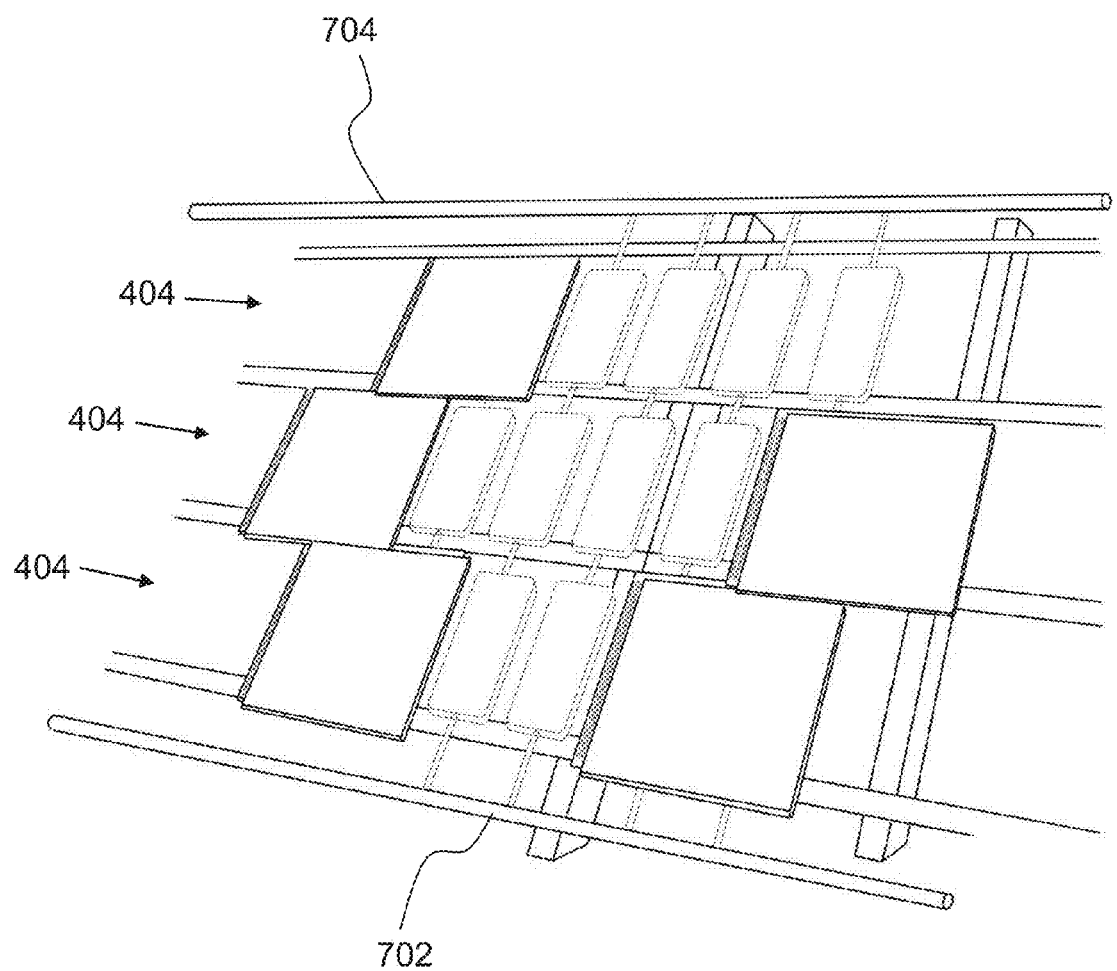
FIG. 7 is a perspective diagram of a roof with a partial cutaway illustrating an installed roof tile system including fluid cassettes.

As shown in FIG. 7, the cassette recess 180, channels 184, 186 and holes 186 enable the exemplary cassettes described above with reference to FIG. 5 to be interconnected to form a solar thermal energy capture system 700. Where solar thermal energy cassettes 500 are fitted to the tiles 100, the outlet opening 514 of a cassette 500 fitted to a tile 100 in, for example, the second row 404, is inserted into a corresponding inlet opening 508 in a cassette 500 fitted to a tile 100 in the first row 404 to make a fluidic connection. Similarly, the outlet opening 514 of a cassette 500 fitted to a tile 100 in the third row 404, is inserted into a corresponding inlet opening 508 in a cassette 500 fitted to a tile 100 in the second row 404 to make a fluidic connection, and so on. The outlet opening 514 of the cassette 500 fitted to tiles 100 in the first row 404 may be connected to a common drain 702, and the inlet openings 508 of cassettes 500 fitted to tiles 100 in the uppermost row 404 of tiles 100 can be connected to a common fluid supply 704. The common fluid supply 704 and common fluid drain 702 can then be connected to a heat exchange system (not shown) having a fluid pump (not shown) to complete a heat exchange circuit. In use, the heat exchange circuit may be filled with fluid, such as a glycol-based fluid, which can be pumped by the fluid pump around the heat exchange circuit.

The common fluid supply 704 may be mounted above the uppermost row 404 of tiles 100 in the roof 400. Fluid is pumped to the common supply 704 by the fluid pump and, because of the serial connections of interconnected cassettes 500 enabled by the configuration of roof tile 100 described, the fluid can then cascade from the highest row 400 of tiles 100, with the assistance of gravity, to successively lower rows 400 of tiles 100. The fluid can then absorb solar thermal energy as it cascades. The fluid can be drained to the common drain 702 from where it can flow to the heat exchanger to exchange the absorbed thermal energy.

Figure 8:
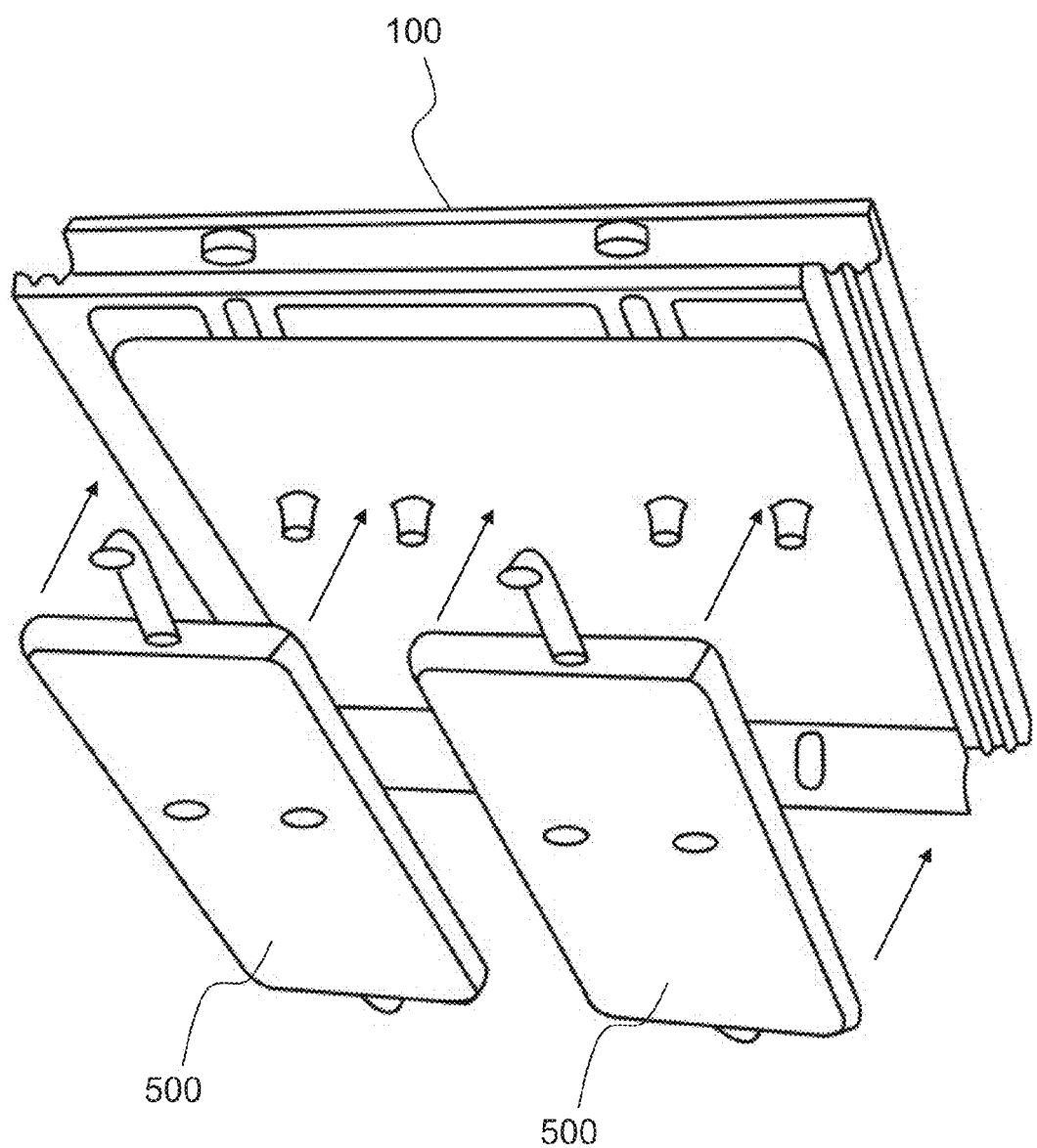
FIG. 8 is a perspective diagram illustrating a method of installing fluid cassettes into a recess in a roof tile.

The cassettes 500 may be fitted to the tiles 100 at the time of manufacture, or may be fitted during installation of the roof 400 as depicted in FIG. 8. FIG. 8 shows the cassette 500 being installed in the cassette recess 180 after the flange 150 is inserted into the tile-holding device 200 but before the lower end 108 of the tile 100 is engaged with the upper end 106 of a tile 100 in the row 404 immediately below. Indeed, because the protrusions 118 enable the front ends 108 of the tiles 100 to be easily lifted after installation, as described above, it is possible to install the solar thermal cassettes 500 after installation of the roof 400 with relative ease.

The above embodiments are to be understood as illustrative examples of the invention. Further embodiments of the invention are envisaged. For example, the protrusions could instead be located in the upper portion of the front surface of the tile, and corresponding holes be located in the lower recess of the tile.

Figure 9:
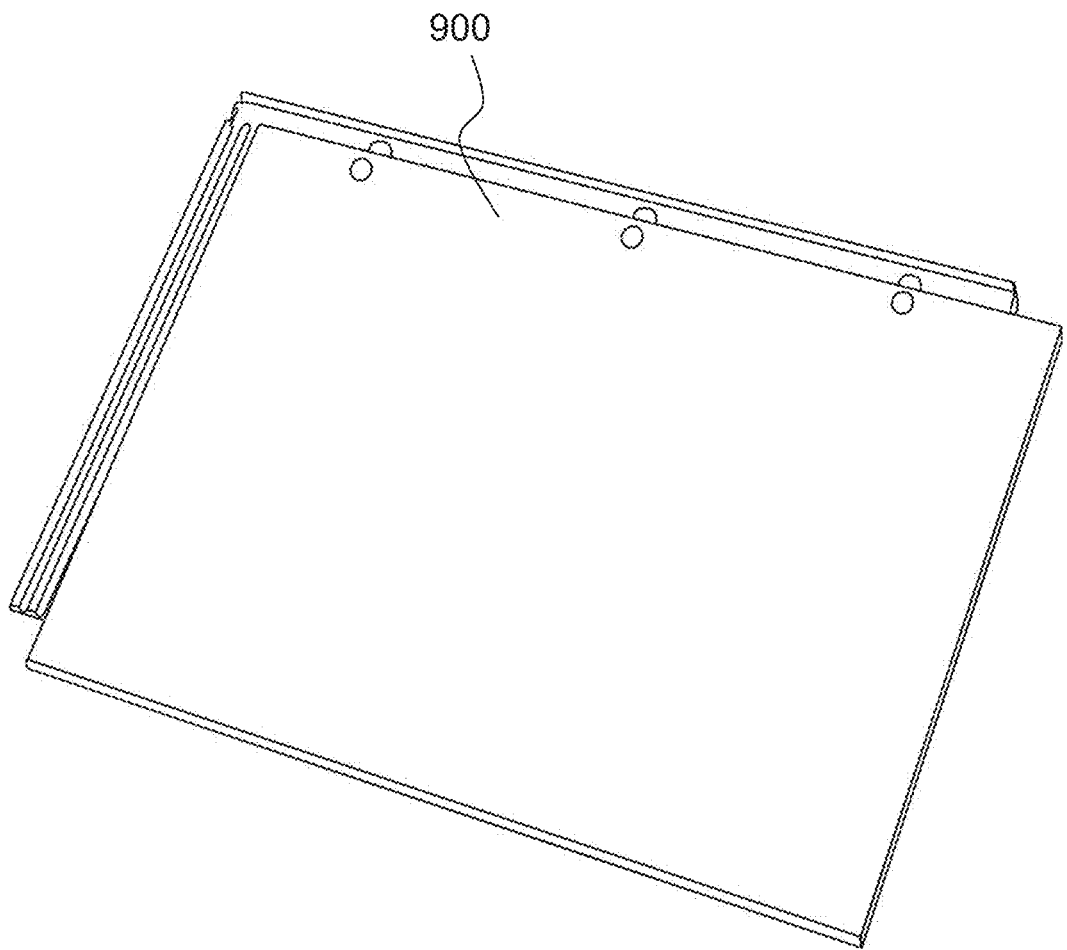
FIG. 9 is a perspective diagram illustrating a roof tile in accordance with a an embodiment.

Furthermore, the tiles may have different proportions to those described above. For example, FIG. 9 shows a tile 900 is 1.5 times wider that the tile 100 described above. The tile 900 may be used in conjunction with standard tiles 100 when installing a roof. By providing both square tiles 100 and tiles 900 that are 1.5 times wider than the square tiles 100 the need to cut the square tiles 100 to fit hips and ridges in the roof and to cover the roof is reduced.

Figure 10:
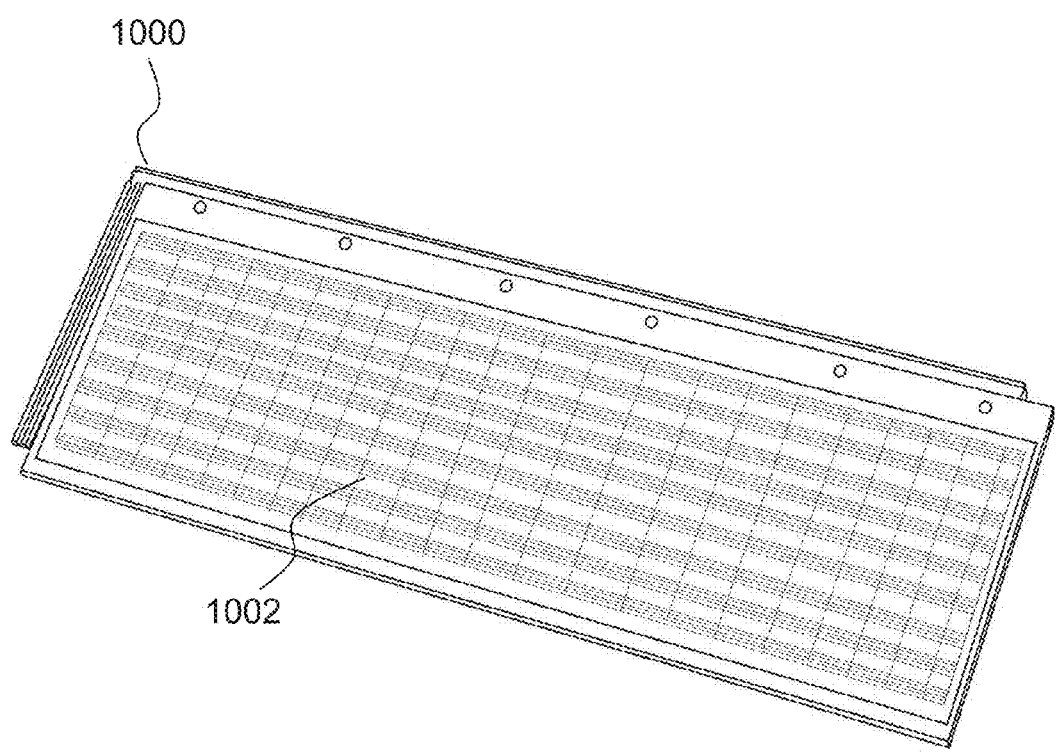
FIG. 10 is a perspective diagram illustrating a roof tile in accordance with an embodiment.

FIG. 10 shows a further embodiment, in which a tile 1000 is 3 times wider than the square tile 100. In addition, this tile 1000 may be provided with a photovoltaic panel 1002. Of course, it will be understood that any of the tiles described above could be provided with such a photovoltaic panel.

Referring now to FIGS. 11a to 12c, there are illustrated two variations of the tile 100 illustrated in FIGS. 1a and 1b. Features already described with respect to FIGS. 1a and 1b are given like reference numerals in FIGS. 11a to 12c and will not be described in detail again.

In the tile 100 illustrated in FIGS. 1a and 1b, the protrusions 118 are formed during the manufacturing of the tile by the material of the mix used to cast the tile 100. In the alternative tile 100' illustrated in FIG. 11a, instead of the protrusions 118, there are provided a plurality of protrusions 161 each comprising a rigid member 162, in this example a threaded flat headed screw 162, and an elongated compressible member 164. Each screw 162 is set in place during the manufacturing process of the tile 100', for example by encasing or molding the head of a screw within the material of the tile 100' so that the threaded portion of the screw 162 extends from the tile 100' and an elongated compressible member 164 is fixed over the threaded portion to cover the screw 162. Each compressible member 164 comprises a tapered anchor portion 165 at its free end. In one example, each elongated compressible member 164 is a simple plaster board plug and is screwed onto its respective screw 162.

In this example, each of the holes 116 on the upper surface 102 of a tile 100 extends all of the way through the tile 100', so as to form an aperture that is open at both ends.

Figure 11A:
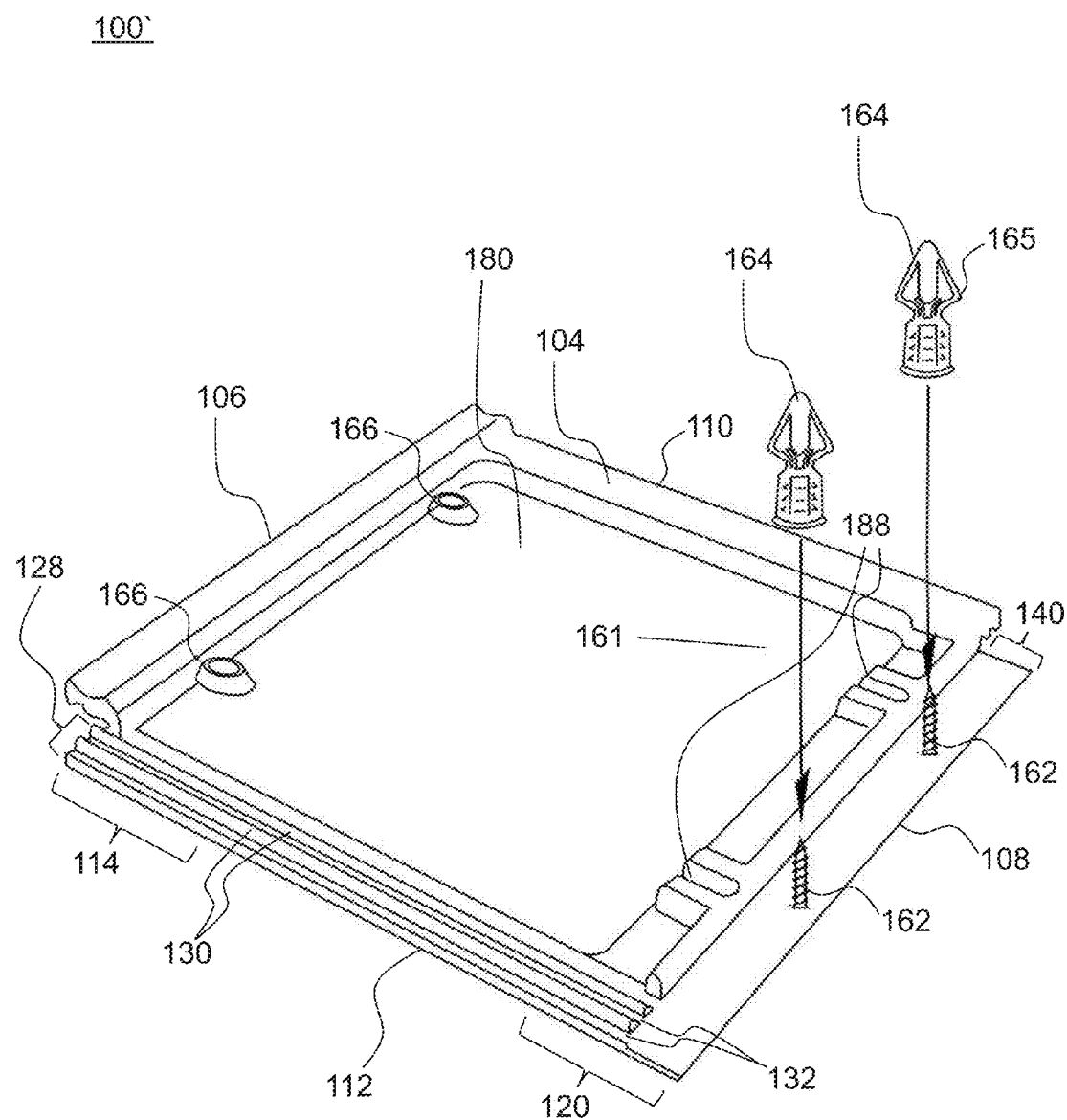
FIG. 11a is a perspective diagram illustrating a back side of a roof tile in accordance with an embodiment.
Figure 11B:
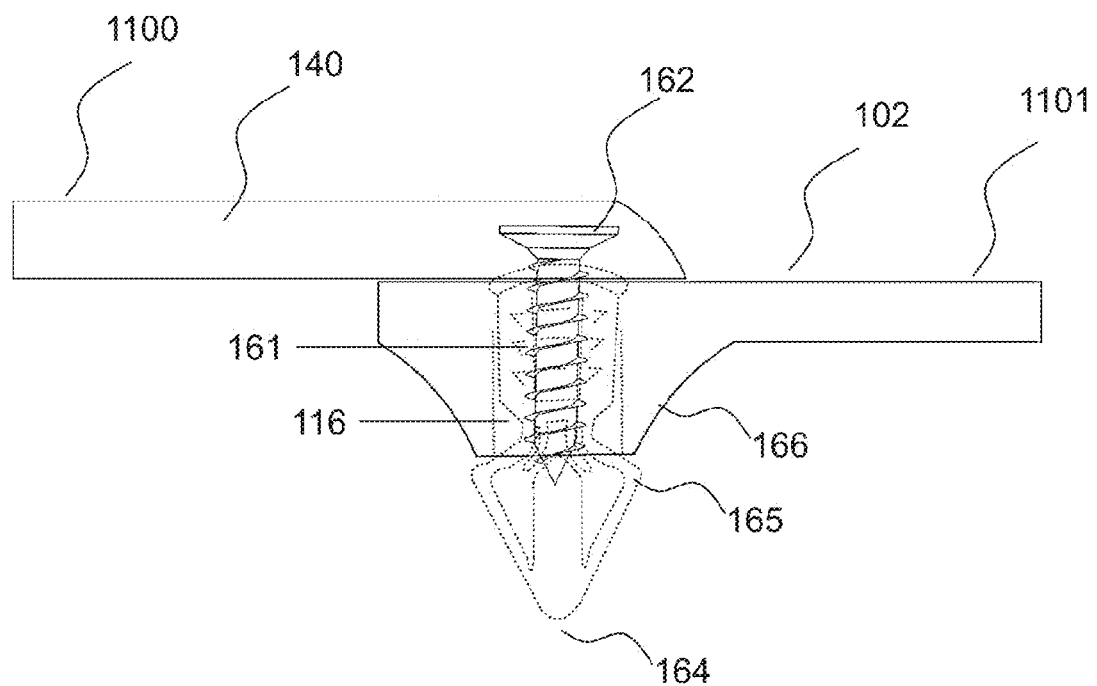
FIG. 11b is a cross section illustrating an exemplary fixing mechanism.

With this arrangement, as is schematically illustrated in FIG. 11*b*, a first tile 1100 in a first row may be attached to a second tile 1101 in a second row in a similar fashion as previously described above with reference to the tiles 100 except that in this example a protrusion 161 of the first tile 1100 is pushed through a hole 116 of the second tile 1101 so as to form snap fit connection between the two. More specifically, the flange (not shown in FIG. 11*b*) of the first tile 1100 is located in a tile-holding device (not shown in FIG. 11*b*) as previously described and the first tile 1100 is pivoted towards the second tile 1101 so that a protrusion 161 of the first tile 1100 is pushed through a hole 116 of the second tile 1101. As the protrusion 161 is pushed into the hole 116 contact forces compress the tapered anchor portion 165 causing it to flex inwardly and so reduce its profile or diameter so that the it can freely pass through the hole 116.

When the anchor portion 165 has passed through the hole 116 and there is no longer a compressive force applied to it, the anchor portion 165 flexes outwardly (e.g. snaps back) to its non-compressed diameter or profile and abuts against the underside of second tile 1101 so that the first 1100 and second 1101 tiles are attached together. In this un-compressed state, the profile or diameter of the anchor portion 165 is larger than the diameter of the hole 116 so the protrusion 161 is resistive to be being pulled back through the hole 116. In some embodiments, a collar 166 is provided around each hole 116 on the back surface 104 of a tile 100' to provide for better engagement with an anchor portion 165 that has been inserted through the hole 116.

It should be appreciated that, as mentioned above, with reference to FIG. 4*c*, the tiles 100 in the second (lower) row of tiles 404 may be staggered by, for example, half a tile width with respect to the first (upper) row of tiles 404. Returning to FIG. 11*a* therefore, it will be appreciated that upon installation, one protrusion 161 of tile 100 may engage with a hole 116 of a first tile of a lower row of tiles, and the other protrusion 161 of tile 100 may engage with a hole 116 of a second tile of a lower row of tiles. It will be appreciated, therefore, that the distance between protrusions 161 of a tile 100, or indeed any fixing elements or protrusions of the embodiments described herein, need not necessarily be the same distance as the distance between the holes 116 in the upper portion 114 of the front surface 102 of a tile 100.

Figure 12A:
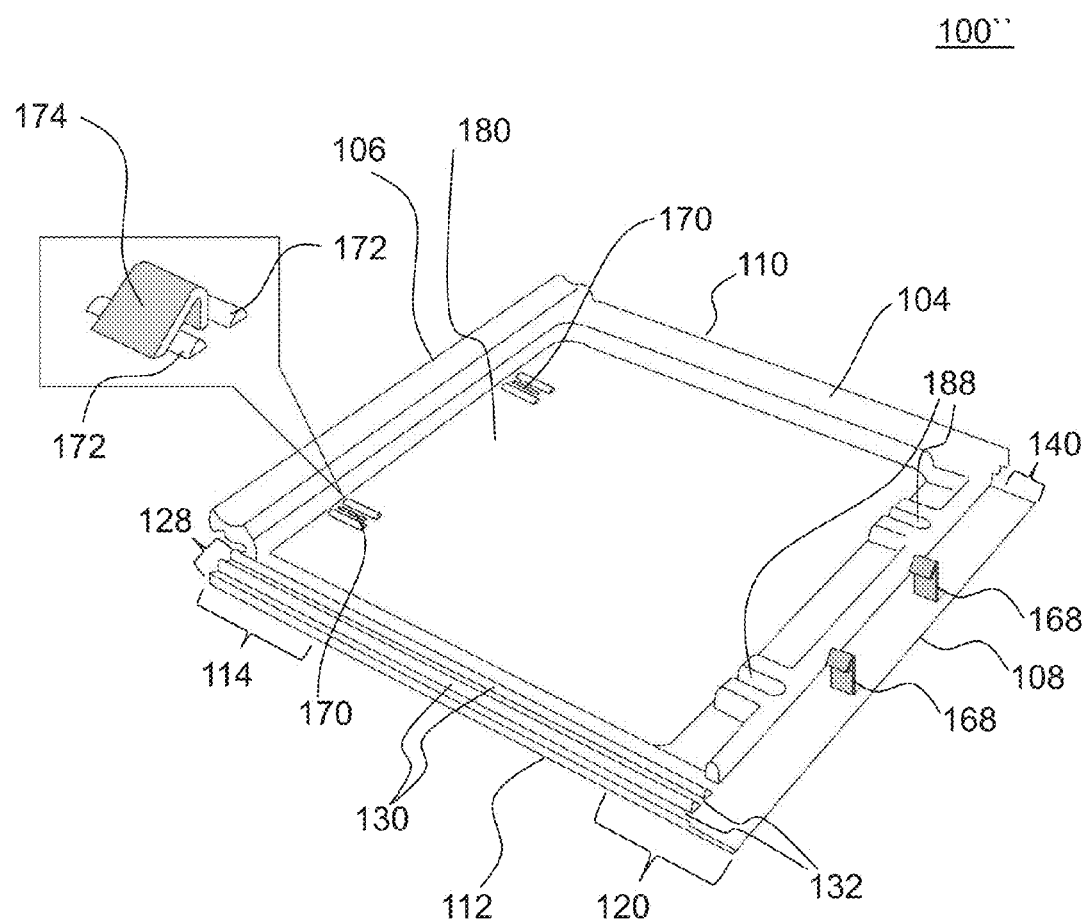
FIG. 12a is a perspective diagram illustrating a back side of a roof tile in accordance with an embodiment.
Figure 12B:
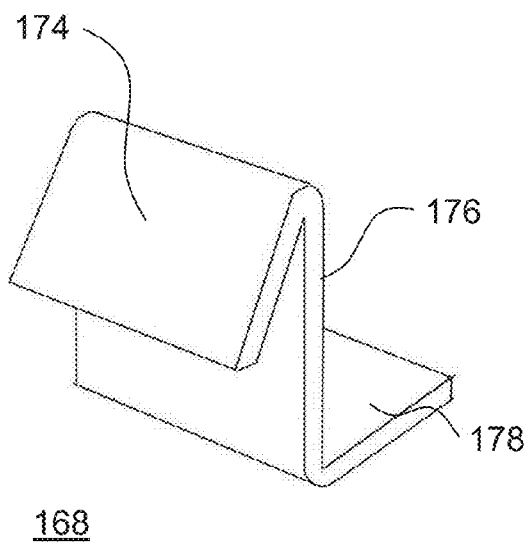
FIG. 12b is a perspective diagram illustrating an exemplary fixing mechanism.
Figure 12C:
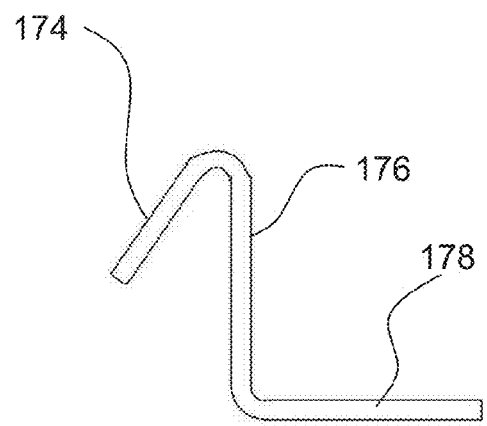
FIG. 12c is a cross section illustrating an exemplary fixing mechanism.

In the alternative tile 100" illustrated in FIG. 12*a*, each of the protrusions 168 is a flexible hook 168, for example made of a suitable metal such as aluminum, stainless steel, or copper, or, for example, made of a suitable high density plastic. As best illustrated in FIGS. 12*b* and 12*c*, each hook 168 comprises a base section 178, a body section 176 extending substantially perpendicularly from the base section 178 and a hook section 174 extending downwardly from the top of the body section 176. A hook 168 may be formed of a single metal strip cut or bent into shape.

Each hook 168 is set in place during the manufacturing process of the tile, for example, by placing its base section in a recess prior to curing which then encases the base section 178 within the material of the tile 100". Alternatively, each flexible hook 168 may be attached to the tile 100" by any suitable fixing means, for example using an adhesive to attach the base section 178 to a tile.

In this example there are a plurality of slits 170, each extending through the tile 100" so as to form an aperture open at both ends. A pair of spaced apart raised portions 172 straddle each slit 170 on the bottom surface 104 of the tile 100".

With this arrangement, a first tile in a first row may be attached to a second tile in a second row in a similar manner as described above with respect to the tile 100', by, as illustrated in the expanded section of FIG. 12*a*, inserting a flexible hook 168 of the first tile through a slit 170 of the second tile to form a snap fit connection between the two.

As the flexible hook 168 is brought to a slit 170 in the upper portion 114 of the front surface 102 of the second tile so that the plane of the body section 176 is parallel with the plane of the slit 170, the flexible hook 168 is pushed into the slit 170 and, as a result, the hook portion 174 is compressed or flexes against the body section 176, reducing the profile of the flexible hook 168 so that the entire hook portion 174 may pass through the slit 170. When the entire hook portion 174 has passed through the slit 170 and there is no longer a compressive force applied to it, the hook portion 174 flexes outwardly and so returns (or snaps) to substantially the same configuration as before compression, and hence the snap fit is achieved. The hook portion 174 may extend over and abut against a raised portion 172 to provide for a secure engagement.

The structural specification of the flexible hook 168 (e.g. its thickness and the material from which it is made) may be selected so that the force required to flex the hook portion 174 enough so that the tiles can be detached is sufficiently large, such that it is unlikely to be achieved in normal use, for example by wind, but may be achieved by a person wishing to remove the tile, for example by hand or using a tool. Similar consideration may be given to the specification of other fixing elements in other exemplary embodiments of the present invention.

It will be appreciated that either of the tiles 100' and 100" may be adapted to comprise a fluid cassette (not shown) that forms part of a solar energy capture system as described previously with respect to the tile 100.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A roof tile system, comprising:
   a first roof tile comprising:
   a flexible protrusion extending from a first side of the first roof tile at a first end portion of the first roof tile, wherein the flexible protrusion comprises a base section and a body extending from the base section, and the base section is encased within the material of the first roof tile and;
   a flange extending from a second end portion of the first roof tile opposite the first end portion of the first roof tile; and
   an aperture extending from the first side to a second side, opposite the first side, the aperture being located between the flexible protrusion and the flange; and a tile holding device configured to rest directly on and be fixed to a roof, the tile holding device comprising a channel for receiving the flange so as to inhibit lifting of the first end portion away from the roof, wherein the flexible protrusion of the first roof tile is arranged to be inserted through an aperture of a second roof tile, the flexible protrusion being arranged to flex between a first position in which the flexible protrusion can pass through the aperture of the second roof tile, and a second position in which the flexible protrusion resists removal from the aperture of the second roof tile when the first roof tile and the second roof tile are arranged in adjacent rows on the roof, so as to inhibit lifting of the second end portion of the first roof tile away from the roof.

2. The roof tile system according to claim 1, wherein the flexible protrusion comprises an anchor portion for abutting to the second roof tile to attach the first roof tile thereto when the flexible protrusion is received in the aperture of the second roof tile.

3. The roof tile system according to claim 2, wherein the first roof tile comprises a raised portion on the second side of the first roof tile and adjacent the aperture, over which a corresponding anchor portion of a flexible protrusion of one of the second roof tile and a third roof tile can hook when the flexible protrusion of the one of the second roof tile and the third roof is received in the aperture.

4. The roof tile system according to claim 1, wherein the first end portion comprises a recessed portion and the flexible protrusion is disposed in the recessed portion.

5. The roof tile system according to claim 1, wherein the first roof tile comprises a first surface that is visible in use and a second surface that comprises a cassette recess portion arranged to receive a cassette for containing a fluid to be heated, and the cassette recess comprises means to secure a cassette in the cassette recess.

6. The roof tile system according to claim 5, wherein the second surface comprises channels arranged to receive fluid connections disposed on the cassette.

7. The roof tile system according to claim 6, further comprising at least one inlet channel arranged to receive an inlet fluid connection of the cassette and at least one outlet channel arranged to receive an outlet fluid connection of the cassette, wherein at least a portion of the inlet channel extends from the second surface to the first surface of the first roof tile.

8. The roof tile system according to claim 5, further comprising a cassette in the cassette recess portion.

9. The roof tile system according to claim 1, further comprising a first edge and a second edge, wherein the first edge comprises at least one ridge extending along the first edge on a first surface and the second edge comprises at least one valley, corresponding to the at least one ridge, the valley extending along the second edge on a second surface.

10. The roof tile system according to claim 9, wherein the depth of the at least one valley varies from a first depth at the first end portion to a second depth at the second end portion and the first depth being greater than the second depth.

11. The roof tile system according to claim 10, wherein the flange comprises a channel arranged to carry water to an edge of the tile.

12. The roof tile system according to claim 1, wherein the first tile is arranged to attach, via the flexible protrusion, to the second roof tile and, via a second flexible protrusion, to at least one further roof tile.

13. The roof tile system according to claim 1, wherein the channel is arranged to enable insertion or removal of the flange when the first roof tile is in a first orientation and to prevent insertion or removal of the flange when the first roof tile is in a second orientation.

14. A method of installing a roof tile system, the method comprising:

fixing a tile holding device onto a roof, the tile holding device being configured to rest directly on the roof;

engaging a flange of a first roof tile, in a first orientation, within a channel of the tile holding device, the flange extending from a first end portion of the first roof tile;

moving the first roof tile into a second orientation so as to insert a flexible protrusion of the first roof tile through an aperture of a second roof tile in an adjacent row to form a snap fit connection between the first roof tile and the second roof tile, the flexible protrusion extending from a first side of the first roof tile at a second end portion of the first roof tile, opposite the first end portion, and the flexible protrusion comprising a base section and a body section extending from the base section, the base section being encased within the material of the first roof tile, wherein the aperture is located between the flexible protrusion and the flange and extends from a first side of the second roof tile to a second side of the second roof tile, opposite the first side.

15. The method according to claim 14, further comprising:

engaging a flange of a third tile, in the first orientation, with the tile holding device, the third tile being engaged with the tile holding device adjacent to the first tile; and moving the third tile into the second orientation so as to attach the third tile by means of a first attaching means of the third tile to the second tile.

16. The method according to claim 14, wherein the moving is a pivoting action.

* * * * *